US006654561B1

United States Patent
Terahara et al.

(10) Patent No.: US 6,654,561 B1
(45) Date of Patent: Nov. 25, 2003

(54) METHOD AND APPARATUS FOR MEASURING OPTICAL SIGNAL-TO-NOISE RATIO, AND PRE-EMPHASIS METHOD AND OPTICAL COMMUNICATION SYSTEM EACH UTILIZING THE METHOD

(75) Inventors: Takafumi Terahara, Kawasaki (JP); Takeshi Sakamoto, Kawasaki (JP); Hiroaki Tomofuji, Kawasaki (JP); Motoyoshi Sekiya, Kawasaki (JP); Makoto Murakami, Sapporo (JP); Kazuo Yamane, Kawasaki (JP); Hiroshi Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 588 days.

(21) Appl. No.: 09/699,479

(22) Filed: Oct. 31, 2000

(30) Foreign Application Priority Data

Jan. 18, 2000 (JP) ...................... 2000-009387

(51) Int. Cl.[7] ............................................. H04B 10/08
(52) U.S. Cl. .............................. 398/26; 398/25; 398/34
(58) Field of Search .............................. 398/25–26, 34, 398/37

(56) References Cited

U.S. PATENT DOCUMENTS 5,282,074 A * 1/1994 Miyazaki et al. ............ 398/26
5,513,029 A * 4/1996 Roberts ....................... 398/32
5,654,816 A * 8/1997 Fishman ...................... 359/349
6,323,978 B1 * 11/2001 Harley et al. ................ 398/30

OTHER PUBLICATIONS

Patent Abstracts of Japan of JP 09–261205 dated Oct. 3, 1997.
Patent Abstracts of Japan of JP 11–103287 dated Apr. 13, 1999.
Chraplyvy et al., "Equalization in Amplified WDM Lightwave Systems", AT&T Bell Laboratories, Holmdel, NJ 07733, pp. ThA5–1/95 through ThA5–4/95.
Patent Abstracts of Japan of JP 06–069891 dated Mar. 11, 1994.
Patent Abstracts of Japan of JP–07–235719 dated Sep. 5, 1995.

* cited by examiner

*Primary Examiner*—Kinfe-Michael Negash
(74) *Attorney, Agent, or Firm*—Staas & Halsey LLP

(57) ABSTRACT

In a method of measuring an optical signal-to-noise ratio according to the present invention, a partial optical signal-to-noise ratio is defined, the partial optical signal-to-noise ratio is calculated from a predetermined physical quantity, the sum of inverse numbers of the partial optical signal-to-noise ratios is calculated, and further an inverse number of the sum is calculated to acquire an optical signal-to-noise ratio. The present invention makes it possible to measure optical SNR without directly measuring ASE in the optical signal. The present invention provides a measuring apparatus, a measuring circuit, a pre-emphasis method, an optical communication system, and a controlling apparatus each utilizing this method.

36 Claims, 22 Drawing Sheets

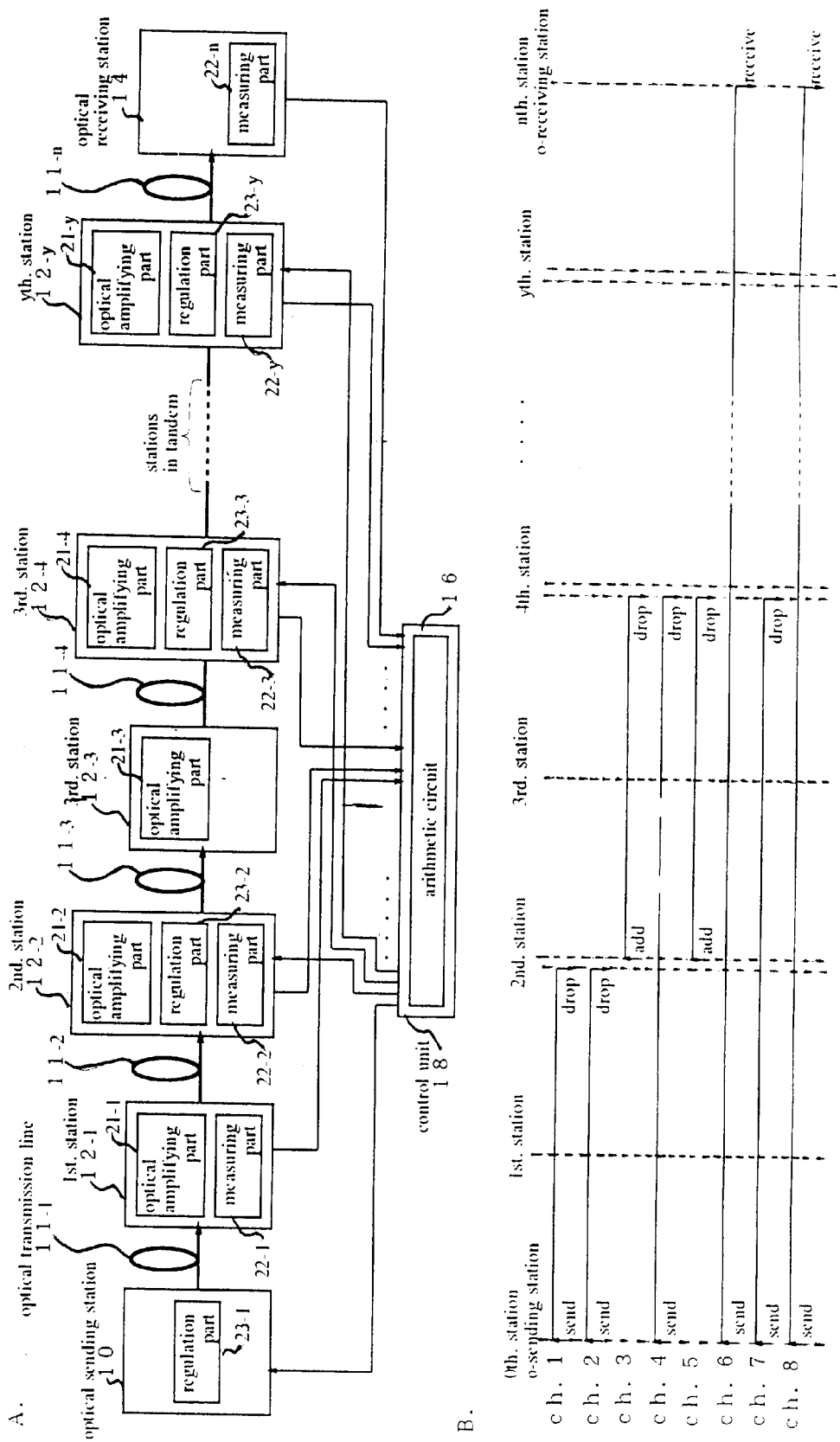

waveform of transmission waveform of reception waveform of transmission

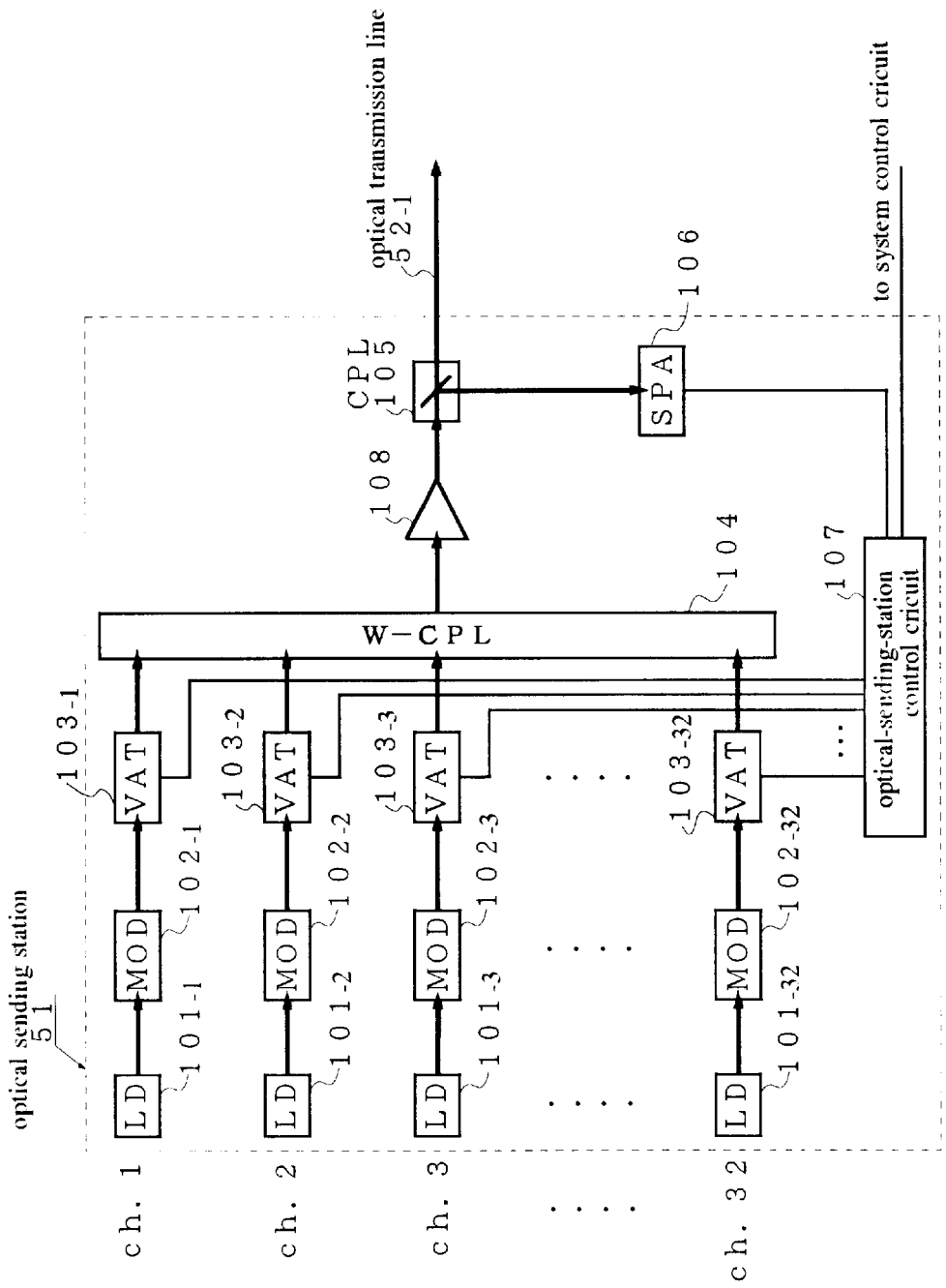

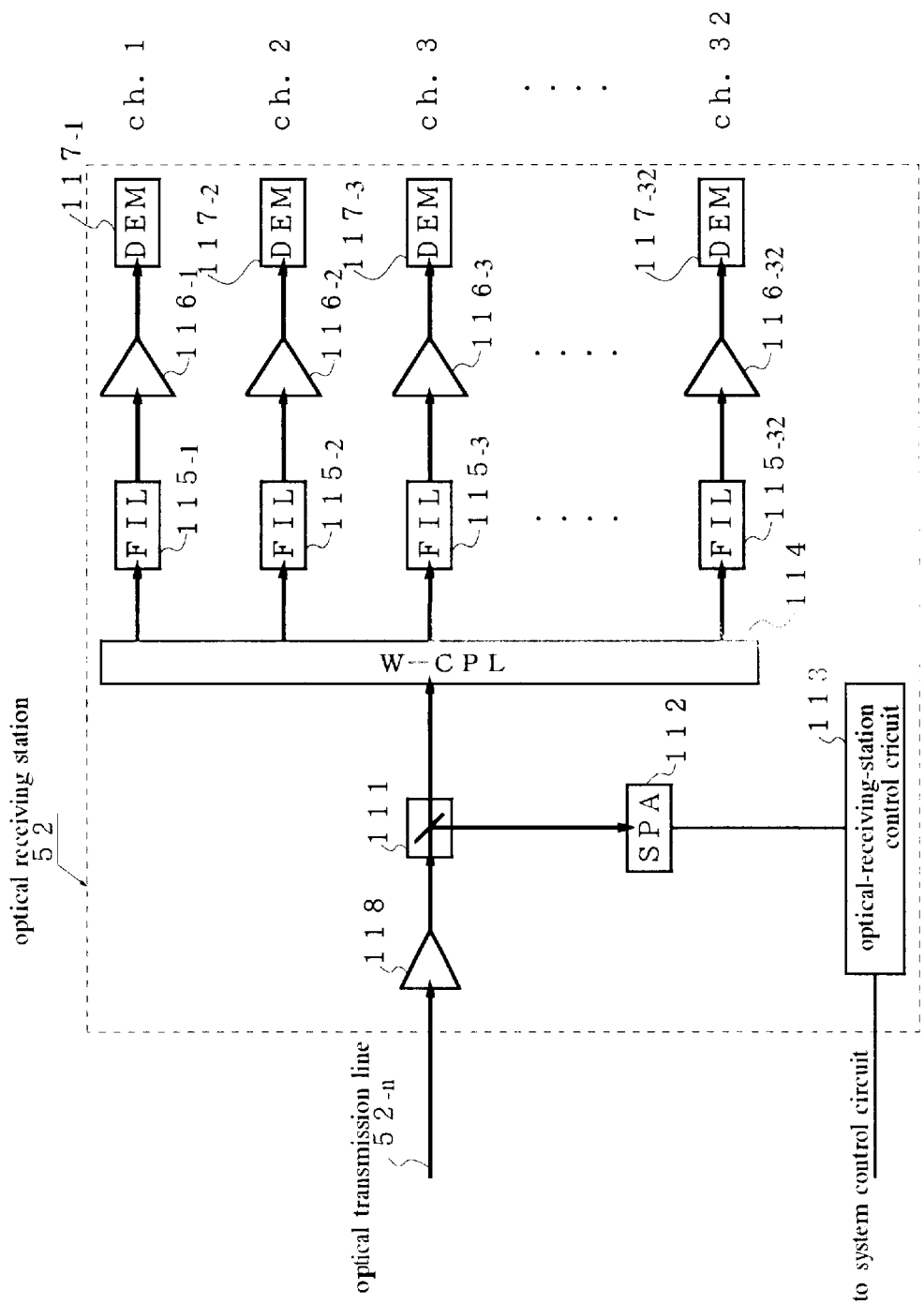

F I G. 10

|        | sending station | 1st. station | 2nd. station | 3rd. station | 4th. station | 5th. station | .... | nth. station | receiving station |
|--------|-----------------|--------------|--------------|--------------|--------------|--------------|------|--------------|-------------------|
| all ch. | Poutav,0 | Poutav,1 | Poutav,2 | Poutav,3 | Poutav,4 | Poutav,5 | ··· | Poutav,n | Poutav,n+1 |
| P. G. 1 | Poutg1,0 | Poutg1,1 | Poutg1,2 | Poutg1,3 | Poutg1,4 | Poutg1,5 | ··· | Poutg1,n | Poutg1,n+1 |
| P. G. 2 | Poutg2,0 | Poutg2,1 | Poutg2,2 | — | — | — | ··· | — | — |
| P. G. 3 | — | — | Poutg3,2 | Poutg3,3 | Poutg3,4 | Poutg3,5 | ··· | Poutg3,n | Poutg3,n+1 |
| P. G. 4 | — | — | Poutg4,2 | Poutg4,3 | Poutg4,4 | Poutg4,5 | ··· | — | — |
| P. G. 5 | — | — | — | — | — | Poutg5,5 | ··· | Poutg5,n | Poutg5,n+1 |

METHOD AND APPARATUS FOR MEASURING OPTICAL SIGNAL-TO-NOISE RATIO, AND PRE-EMPHASIS METHOD AND OPTICAL COMMUNICATION SYSTEM EACH UTILIZING THE METHOD

BACKGROUND OF THE INVENTION

1. Field of the Invention

The present invention relates to a method and apparatus for measuring an optical signal-to-noise ratio of a wavelength-division multiplexing optical signal where optical signals are multiplexed in a high density, in a method and. apparatus for measuring an optical signal-to-noise ratio of wavelength-division multiplexing optical signals. The present invention further relates to a pre-emphasis method, an optical communication system, a measuring circuit, and a controlling apparatus each utilizing this optical signal-to-noise ratio measuring method.

Recently, an optical communication system with an ultra-long distance and large capacity has been demanded in order to constitute a multi-media network. To achieve this. object, a wavelength-division multiplexing (WDM) system has been researched and developed since it has advantages in effectively utilizing optical fibers characteristics of broad-band and large capacity.

It is particularly a recent trend to narrow wavelength gaps between optical signals that are wavelength-multiplexed, in order to satisfy the requirement for a greater capacity. A method of measuring an optical signal-to-noise ratio of WDM optical signals at high-density has been needed in order to maintain signal quality even when such a WDM optical signal is transmitted.

2. Description of the Related Art.

When optical signals are transmitted in a long distance, in general, optical signals are amplified by an optical repeater station provided with an optical amplifier between an optical signal sending station and an optical signal receiving station to compensate for a transfer loss of an optical transmission line. When amplified, the optical signal is superposed with amplified spontaneous emission (ASE) generated by the optical amplifier. This ASE is cumulatively superposed every time when the optical amplifier amplifies the optical signal. The cumulative ASE is a noise to the optical signal. To keep predetermined signal quality, therefore, the optical SNR of the optical signal has to be measured.

An optical SNR measuring method according to the prior art will be explained with reference to FIG. 20.

FIG. 20 shows the case where a WDM optical signal is amplified by several optical amplifiers and is superposed with ASE. The WDM optical signal contains four-wave optical signals of channels 1 to 4 that are wavelength-multiplied. Each optical signal is arranged with a sufficient wavelength space at its part of a low optical level lest they overlap with one another as shown in FIG. 20. Hereinafter, the term "channel" will be abbreviated as "ch."

In such a WDM optical signal, an optical level at a substantial intermediate wavelength (indicated by X in FIG. 20) between adjacent channels corresponds to the optical level of ASE. Therefore, the optical SNR at a channel can be measured by the steps of measuring the spectrum of the WDM optical signal by using a spectrum analyzer, and calculating a ratio of the optical level at a wavelength at which the channel is disposed (indicated by black circle ● in FIG. 20) to the optical level at an intermediate wavelength (indicated by X in FIG. 20) between the channel and a channel adjacent to this channel from the measurement result.

A level diagram of an optical communication system is generally designed for light at a predetermined wavelength. When the WDM optical signal is transmitted in such an optical communication system, each channel of the WDM optical signal is amplified at a different gain due to nonuniform gain wavelength characteristics as well as gain saturation characteristics in the optical amplifier inside the optical repeater station. Further, each channel loses optical power at a different loss due to nonuniform loss wave characteristics of an optical transmission line. Inconsequence, the more the level diagram in the optical signal whose wavelength deviates from the predetermined wavelength, the more it deviates from the designed level diagram. This causes a greater bit error ratio in the channel having low optical power than the allowable one in the optical communication system.

Therefore, the WDM optical signal is pre-emphasized so that the bit error ratio becomes lower than the allowable bit error ratio.

Next, a conventional pre-emphasis method will be explained with reference to FIG. 21.

Referring to FIG. 21, the WDM optical signal generated by an optical sender (OS) 911 inside an optical sending station 901 is amplified by a plurality of optical repeater stations 903 disposed in the optical transmission line 902 so as to compensate for the loss of the optical transmission line 902 and the loss by the optical repeater stations 903, is then transmitted to the optical receiving station 904 and is processed. The loss in the optical repeater stations 903 results from optical components in each station such as a dispersion compensating fiber (DC).

A pre-emphasis control circuit 912 inside the optical sending station 902 pre-emphasizes the WDM optical signal when the optical sending station 901 sends the WDM optical signal to the optical transmission line 902.

The pre-emphasis control circuit 912 pre-emphasizes the WDM optical signal by regulating the optical level of the optical signal generated by the optical sender 911 and corresponding to each channel. The optical SNR of each optical signal is measured by an optical SNR measuring circuit 922 disposed inside the optical-receiving station 904, such as a spectrum analyzer, and is transmitted through a line 931.

Here, the pre-emphasis control circuit 912 regulates the optical level of each optical signal in the following way, for example.

As a first step, the pre-emphasis control circuit 912 calculates an average value of the optical SNR for all the channels in the optical receiving station 904.

As a second step, it calculates the difference of this average value from the optical SNR of the channel ch.1 in the optical receiving station 904.

As a third step, the optical sending station 901 increases or decreases the optical level sufficient to compensate for this difference from the channel ch.1 and regulates the optical level of the channel ch.1.

As a fourth step, the process of the second and third steps is applied to each optical signal corresponding to each channel of the WDM optical signal.

The optical sending station 901 regulates the optical level of each optical signal in the way described above so that the optical SNR of each channel in the optical receiving station 904 becomes equal to one another.

When the optical level of each optical signal is regulated in this way, the level diagram is regulated for each optical signal. Consequently, when pre-emphasis is applied, the optical SNR of each optical signal in the WDM optical signal can be optimized.

Japanese Unexamined Patent Application Publication Nos. 06-069891, 09-261205, and 11-103287 disclose pre-emphasis in an optical communication system between two terminal stations.

Besides the optical communication system for sending and receiving the WDM optical signals between two terminal stations, an optical communication system having ADM functions of selectively passing only optical signals having a specific wavelength among wavelength-multiplexing optical signals inside a station interposed in an optical transmission line, dropping the optical signals having other wavelengths in this station, or adding separate optical signals and sending them to other stations has been required in recent years. It is a recent trend that the ADM function is realized without converting the WDM optical signal from the optical signal to the electric signal but by utilizing an optical add/drop multiplexer (OADM) for dropping and adding the optical signals as they are.

When a channel is dropped/added, OADM removes the channel to be dropped by using an optical filter, for example, and then adds the optical signal that is to be added, into this channel. In this case, the optical filter removes not only optical power of the channel to be dropped but also ASE within a narrow range with the wavelength of this channel as the center.

FIG. 22 shows a spectrum of a WDM optical signal in which the channel ch.3 is dropped/added by OADM.

When the channel ch.3 is dropped/added from and to the four-wave WDM optical signal shown in FIG. 20, for example, OADM removes light of a narrow range with the wavelength of the channel ch.3 being the center, inclusive of ASE, and thereafter adds the optical signal to be added into the wavelength of the channel 3. Therefore, the WDM optical signal after dropping/adding of the channel ch.3 exhibits the spectrum shown in FIG. 22, and the optical level of ASE drastically changes with respect to the channels adjacent to the channel ch.3.

Furthermore, the optical level of ASE is different between ASE for those optical signals which are not dropped/added and ASE for the optical signal that is dropped/added because the number of repeating of the optical amplifiers is different.

Incidentally, a higher density has been required for the WDM optical signal in recent yeas for further reducing the wavelength gap of each wavelength-multiplexing optical signal so as to satisfy the requirement for a greater capacity. A wavelength width of an optical signal is small at a high optical level part and becomes gradually greater as the optical level becomes lower. The optical signal generally has a broad wavelength width at its low optical level part, in particular. Therefore, a low optical level part of each optical signal in a high-density WDM optical signal overlaps with one another as shown in FIG. 22B. As a result, even when the optical level at a substantial center wavelength part of each channel is measured in order to measure the optical SNR, this measurement results in the measurement of the optical level of light a part of which superposes with ASE, and the optical level of ASE cannot be measured. In other words, the prior art method cannot measure the optical SNR.

As to the WDM optical signal after being dropped/added, ASE before and after the channels that are dropped/added exhibits a drastic change as shown in FIG. 22. Therefore, the optical SNR of this channel cannot be measured because ASE cannot be measured.

It is difficult to perform optimum control in the optical communication system where the control is made based on the measurement result of the optical SNR due to the incapability of measuring the optical SNR as described above.

SUMMARY OF THE INVENTION

An object of the present invention is to provide a method of measuring an optical SNR, its apparatus, and its measuring circuit without directly measuring ASE of optical signals.

Another object of the present invention is to provide a pre-emphasis method, an optical communication system, and a controlling apparatus each utilizing an optical SNR obtained without directly measuring ASE of a WDM optical signal.

The objects described above can be accomplished by a measuring method where an optical SNR is acquired by defining a partial optical SNR, obtaining the optical SNR from predetermined physical quantity and a sum of inverse numbers of the partial optical SNRs, and further obtaining an inverse number of the sum.

The objects described above can be also accomplished by an apparatus for measuring an optical SNR, which comprises a measuring part for measuring a predetermined physical quantity in a plurality of stations and an arithmetic circuit for obtaining a partial optical SNR from the predetermined physical quantity to acquire an optical SNR.

The objects described above can be accomplished by a measuring circuit that receives a predetermined physical quantity in a plurality of stations and obtains a partial optical SNR from the predetermined physical quantity to acquire an optical SNR.

The objects described above can be accomplished by performing a pre-emphasis method in which a partial optical signal-to-noise ratio from a predetermined physical quantity and an optical SNR of zone from the partial optical signal-to-noise ratio are obtained to regulate optical levels of a plurality of optical signals so that the optical SNR of zone becomes equal.

The objects described above can be accomplished by an optical communication system which comprises: a measuring part for measuring a predetermined physical quantity in a plurality of stations; an arithmetic circuit for obtaining an optical level of an optical signal according to a predetermined pre-emphasis method according to predetermined physical quantity when the optical signal to be wavelength-multiplexed is first inputted to an optical transmission line; and a regulating part for regulating optical levels of optical signals to the optical level obtained by the arithmetic circuit.

The objects described above can be further accomplished by a controlling apparatus for performing pre-emphasis that obtains a partial optical signal-to-noise ratio from a predetermined physical quantity and an optical SNR of zone from the partial optical signal-to-noise ratio, and outputs a control signal which regulates optical levels of a plurality of optical signals so that partial optical signal-to-noise ratios become equal, to a station that first inputs an optical signal to be wavelength-multiplexed to an optical transmission line. In the method of measuring the optical signal-to-noise ratio, the measuring circuit, the pre-emphasis method, the optical communication system, and the controlling apparatus, the predetermined physical quantity is defined as an output optical level Pout, a noise index NF, and a gain G. The partial optical SNR is defined by $$\frac{NF \cdot G \cdot h \cdot v \cdot \Delta f}{Pout}$$

according to a Planck's constant h, a frequency ν corresponding to a wavelength of the optical signal, and a frequency Δf corresponding to resolution of an optical SNR to be obtained. And it is possible to obtain an optical SNR without measuring an optical level of ASE by obtaining a sum of inverse numbers in the stations that amplify optical signals. Therefore, it is possible to measure the optical SNR even when ASE cannot be directly measured. Utilizing the measured optical SNR enables pre-emphasis to be performed on a WDM optical signal.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 1A shows a construction of an optical communication system according to the first embodiment of the present invention;

FIG. 1B shows PG in the optical communication system according to the first embodiment;

FIG. 4 shows a construction of an optical sending station in the optical communication system according to the second embodiment;

FIG. 5 shows a construction of an optical receiving station in the optical communication system according to the second embodiment;

FIG. 10 shows an average value of all optical signals of each station in the optical communication system according to the second embodiment and an optical SNR of a PG part of each station;

DESCRIPTION OF THE PREFERRED EMBODIMENTS

Figure 2A:
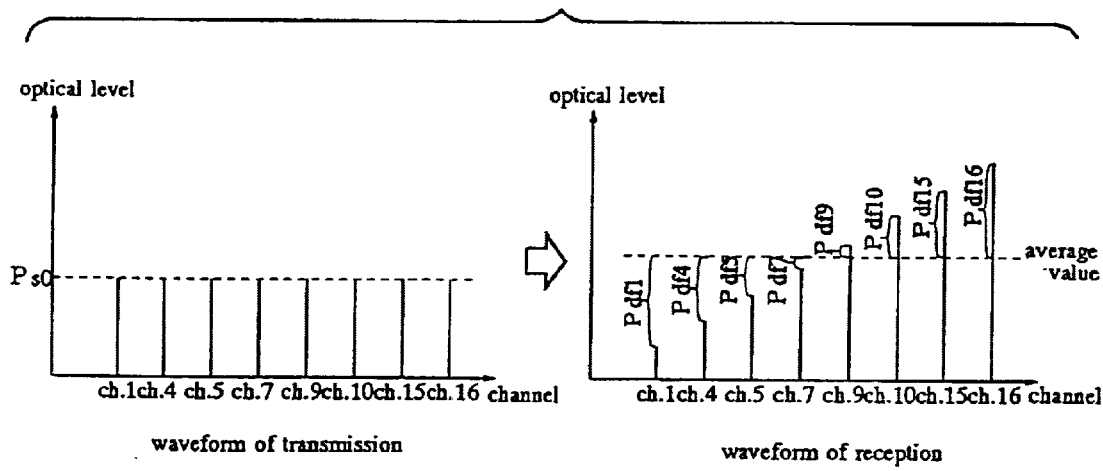
FIG. 2A shows a transmission PG spectrum and a reception PG spectrum when pre-emphasis is not made.

Hereinafter, preferred embodiments of the present invention will be explained with reference to the accompanying drawings. The same reference numeral will be used to identify the same constituent throughout the entire drawings, and repetition of explanation of such a constituent will be omitted in some cases.

First Embodiment

The first embodiment provides an optical communication system according to the present invention.

To begin with, a method and an apparatus for measuring optical SNR will be explained.

Referring to FIG. 1A, the optical communication system includes a plurality of stations 12 each having an optical amplifying part 21 for amplifying a WDM optical signal generated by wavelength-multiplexing a plurality of optical signals in an optical transmission line 11, an optical sending station 10 connected to one of the ends of the optical transmission line 11 and an optical receiving station 14 connected to the other end of the optical transmission line 11. Optical signals are not only transmitted from the optical sending station 10 to the optical receiving station 14 but are also dropped and added in some cases in the station 12 by OADM (not shown) built in the station 12.

To measure optical SNR of the optical signals between two arbitrary stations 12 or between the optical sending station 10 and the optical receiving station 14, an optical SNR measuring apparatus comprises a measuring part 22 and an. arithmetic circuit 16.

The measuring part 22 is provided in two or more stations 12 from among a plurality-of stations 12, and measures a predetermined physical quantity in such stations 12. The measuring part 22 is also provided in the optical receiving station 14. The arithmetic circuit 16 determines the optical SNR in accordance with an optical SNR measuring method to be explained next.

At the first step, the arithmetic circuit 16 receives the predetermined physical quantity from the measuring part 22 and then obtains the predetermined physical quantity in all the stations 12.

When the measuring part 22 is provided in all the stations 12, the predetermined physical quantity from each measuring part 22 represent as such the predetermined physical quantity of each station 12. On the other hand, the predetermined physical quantity of the station 12 not equipped with the measuring part 22 such as the third station 12-3, can be determined according to the predetermined physical quantity measured by the preceding and subsequent stations 12 that are equipped with the measuring part 22.

For example, the difference value of the predetermined physical quantity between the preceding and subsequent stations 12 is proportionally branched according to the length of the optical transmission line 11 ahead of the station 12 and the length of the optical transmission line 11 at the back, and is added to the predetermined physical quantity in the preceding station. In this way, the predetermined physical quantity can be determined. Alternatively, the optical transmission lines equivalent to the preceding and subsequent lines can be prepared to actually measure the value of this proportional branching beforehand.

At the second step, the arithmetic circuit 16 obtains the partial optical SNR in each of the stations 12 according to the predetermined physical quantity determined for all the stations.

At the third step, the arithmetic circuit 16 obtains the sum of the inverse numbers of the partial optical SNR thus determined, and further obtains the inverse number of the sum of the inverse numbers, which is the optical SNR.

Assuming that the partial optical SNR is expressed by $$\frac{Pout_{j,k}}{NF_{j,k} G_{j,k} h v \Delta f} \tag{1}$$

the predetermined physical quantity is an output optical level Pout, a noise index NF and a gain G. Symbol h represents the Planck's constant, $v$ is the frequency corresponding to the wavelength of the optical signal and $\Delta f$ is the frequency corresponding to resolution of the optical SNR.

Therefore, if the optical signal is the WDM optical signal, light SNR j,k of each optical signal is given by $$o-SNR_j = \left( \sum_{k=1}^{\text{all nodes}} \frac{1}{\text{partial } o-SNR_{j,k}} \right)^{-1} \tag{2}$$

from the method described at the first to third steps. J represents a channel number allocated to each of a plurality of optical signals in the WDM optical signal and k is a station number. Therefore, o-SNR j,k is the optical SNR in the k-th station 12-k of the channel j. Pout j,k represents the optical level of the optical signal of the channel j when the channel ch.j is outputted from the k-th station 12-k. NFj,k is the noise index in the k-th station 12-k of the channel ch.j. Gj,k is the gain in the k-th station 12-k of the channel j.

Assuming that the partial optical SNR is expressed by $$\frac{Pin_{j,k}}{NF_{j,k} h v \Delta f} \tag{3}$$

because Pout j,k=Gj,k·Pin j,k, the predetermined physical quantity is the input optical level Pin and the noise index NF. Optical SNR j,k of each optical signal is given by expression (2). Pin j,k represents the optical level of the optical signal of the channel ch.j when the channel ch.j is inputted to the k-th station 12-k.

Assuming further that the partial optical SNR is given $$\frac{Pout_{j,k}}{G_{j,k}} \tag{4}$$

the predetermined physical quantity is the output optical level Pout and the gain G. Optical SNR j,k of each optical signal is given by expression (2).

Assuming that the partial optical SNR is given by $$P_{out_{j,k}} \tag{5}$$

the predetermined physical quantity is the output optical level Pout. Optical SNR j,k of each optical signal is given by expression (2).

Furthermore, assuming that the partial optical SNR is given by $$P_{in_{j,k}} \tag{6}$$

the predetermined physical quantity is the output optical level Pin. Optical SNR j,k of each optical signal is given by expression (2).

Which of expressions (1), (3), and (6) is used as the definition of the partial optical SNR is determined depending on accuracy required for the optical SNR measuring method and the optical SNR measuring apparatus.

As described above, in the optical SNR measuring method and the optical SNR measuring apparatus according to the present invention, the optical SNR can be measured without directly measuring ASE so that the optical SNR of the high-density WDM optical signal can be also measured. Needless to say, the method and the apparatus enables measurement of the optical SNR of one optical signal.

Next, a pre-emphasis method and an optical communication system will be explained.

In FIG. 1A, in the optical communication system a regulation part 23 is comprised. The arithmetic circuit 16 obtains the optical level when the optical signal to be wavelength-multiplexed is first inputted to the optical transmission line 11 according to the pre-emphasis method that will be later described.

The regulation part 23 is provided in the station that first inputs the optical signal to be wavelength-multiplexed to the optical transmission line 11, and regulates the optical level of the optical signal so as to attain the optical level determined by the arithmetic circuit 16. The regulation part 23 is also provided in the optical sending station 10.

The pre-emphasis method in such an optical communication system will be hereinafter explained. At the first step, the arithmetic circuit 16 receives the predetermined physical quantity from the measuring part 22 and obtains the predetermined physical quantity in all the stations 12.

At the second step, the arithmetic circuit 16 obtains the partial optical SNR for each of the stations 12 according to the physical quantities determined for all the stations 12.

At the third step, the arithmetic circuit 16 obtains the sum of the inverse numbers of the partial optical SNR for each of a plurality of optical signals for a zone in which the stations 12 amplifies the optical signal, and obtains further the optical SNR of zone as the inverse number of the sum of the inverse numbers.

At the fourth step, the optical levels of a plurality of optical signals are regulated so that the optical SNR of zone are equal to one another.

Equation (2) is the formula for calculating the optical SNR of an optical signal from the time at which it is first inputted to the optical transmission line to the time at which it is finally outputted. However, the optical SNR of an optical signal between two arbitrary stations can also be calculated. The optical SNR between two arbitrary stations will be called the "optical SNR of zone". Assuming in this case that the two arbitrary stations are the station to which an optical signal is first inputted or the optical sending station 10 and the station 12 that finally outputs the optical signal or the optical receiving station 14, the optical SNR of zone coincides with the optical SNR.

In the case of the channel ch.7 inputted from the optical sending station 10 and outputted (dropped) from the fourth station, the SNR of zone is the value obtained by expression (2) in the optical sending station 10 to the third station 12-3, or the value obtained by expression (2) in the first station 12-1 to the third station 12-3, or the value obtained by expression (2) in the optical sending station 10 to the fourth station 12-4. The value obtained by expression(2) in the optical sending station 10 to the fourth station 12-4 coincides with the optical SNR.

A more concrete example of the pre-emphasis method described above will be explained.

At the first step, the arithmetic circuit 16 receives the predetermined physical quantity from the measuring part 22, and obtains the predetermined physical quantity in all the stations 12.

At the second step, the arithmetic circuit 16 obtains the partial optical SNR of each of the stations 12 according to the predetermined physical quantity determined for all the stations 12.

At the third step, the arithmetic circuit 16 obtains the sum of the inverse numbers of the partial optical SNR of a plurality of optical signals for the zone in which the stations 12 amplifying the optical signal overlap with one another, and further obtains the optical SNR of zone as the inverse number of the sum of the inverse numbers.

At the fourth step, the arithmetic circuit 16 obtains the sum of the partial optical SNR for all the optical signals amplified by each of a plurality of stations 12, and further obtains the average value.

At the fifth step, the arithmetic circuit 16 obtains the difference value between the average value of each of the stations 12 and the partial optical SNR of the optical signal for each of a plurality of optical signals.

At the sixth step, the arithmetic circuit 16 obtains the sum of the difference value for each of a plurality of optical signals and for the stations that amplify the optical signals.

At the seventh step, the arithmetic circuit 16 regulates the optical level of each optical signal so that the sum of the difference values determined for each of a plurality of optical signals becomes zero.

The first to seventh steps can be united into one formula given below, and the arithmetic circuit 16 may regulate the optical level for a plurality of optical signals in such a manner as to satisfy expression (7):

$$\begin{pmatrix} \sum_{k=1}^{\text{all station}} \left( \frac{1}{\text{partial } o\text{-}SNR_{1,k}} - \frac{1}{\text{average value of partial } o\text{-}SNR \text{ of all-optical-}signal_k} \right) \\ \sum_{k=1}^{\text{all station}} \left( \frac{1}{\text{partial } o\text{-}SNR_{2,k}} - \frac{1}{\text{average value of partial } o\text{-}SNR \text{ of all-optical-}signal_k} \right) \\ \vdots \\ \sum_{k=1}^{\text{all station}} \left( \frac{1}{\text{partial } o\text{-}SNR_{m1,k}} - \frac{1}{\text{average value of partial } o\text{-}SNR \text{ of all-optical-}signal_k} \right) \\ \sum_{k=1}^{\text{all station}} \left( \frac{1}{\text{partial } o\text{-}SNR_{m,k}} - \frac{1}{\text{average value of partial } o\text{-}SNR \text{ of all-optical-}signal_k} \right) \end{pmatrix} = 0' \quad (7)$$

Here, the average value j,k of all optical signals is determined by calculating the partial optical SNR for all the optical signals amplified by the k-th station 12-k and calculating the average value when the channel ch.j is amplified by the k-th station 12-k. On the other hand, when the channel ch.j is not amplified by the k-th station 12-k, the average value j,k is zero. Therefore, when the channel ch.j is not amplified by the k-th station 12-k, (partial optical SNR j,k)−(all-optical-signal average value j,k)=0.

According to such a pre-emphasis method, the high-density WDM optical signal can be pre-emphasized. Even when a station equipped with OADM exists between the optical sending station 10 and the optical receiving station 14 and an optical signal is added/dropped, this pre-emphasis method enables pre-emphasis of the WDM optical signal. Even when the optical level of ASE for the optical signal that is not added/dropped is different from the optical level of ASE for the optical signal that is added/dropped, it is possible to apply pre-emphasis to the WDM optical signal in this method. Furthermore, it is also possible to optimize the optical SNR of each optical signal since the level diagram is regulated for each optical signal in the WDM optical signal.

On the other hand, the following pre-emphasis method will be suitable for the stations 12 comprising a station equipped with OADM.

Inside each channel of the WDM optical signal exists the channel that is added from the same optical sending station 10 or 12 into the optical transmission line 11 and is dropped from the same optical receiving station 14 or 12. The channels existing in the same path are collected to create a path group (hereinafter called "PG").

Pre-emphasis is first applied between PG and then inside each PG to achieve overall pre-emphasis.

FIG. 1B shows the path of each channel in the case where the number of channels is 8, by way of example. The channels ch.1 and ch.2 are transmitted from the 0th optical sending station 10 to the optical transmission line 11 and are dropped from the second station. The channels ch.3 and ch.5 are added from the second station 2 to the optical transmission line 11 and are dropped from the fourth station. The channels ch.4 and ch.7 are transmitted from the 0th optical sending station 10 to the optical transmission line 11 and are dropped from the fourth station. The channels ch.6 and ch.8 are transmitted from the 0th optical sending station 10 to the optical transmission line 11 and are received and processed by the nth station of the optical receiving station 14.

In this case, the channels ch.1 and ch.2 can be put together to the path group PG1. The channels ch.3 and ch.5 can be put together to PG2. The channels ch.4 and ch.7 can be put together to PG3. The channels ch.6 and ch.8 can be put together to PG4.

As to pre-emphasis between PGS when PG is introduced, the partial optical SNR of path group corresponding to the optical level of the optical signal is regulated by the process similar to the steps 1 through 7 described above by using the PG partial average optical SNR m,k as the average value of the partial optical SNR j,k of all the channels inside PG in place of the partial optical SNR j,k of expression (1).

In other words, at the first step, the arithmetic circuit 16 receives the predetermined physical quantity from the measuring part 22 and obtains the predetermined physical quantity in all the stations 12.

At the second step, the arithmetic circuit 16 obtains the partial optical SNR of each station 12 according to the predetermined physical quantity obtained for all the stations 12.

At the third step, the arithmetic circuit 16 obtains the sum of the partial optical SNR for each of the stations 12 and for all the optical signals amplified by the station, and further obtains the average value of all the optical signals.

At the fourth step, the arithmetic circuit 16 collects those optical signals which have the same zone from their first input to the optical transmission line 11 to their final output, to one PG.

At the fifth step, the arithmetic circuit 16 obtains the sum of the partial optical SNR for each of a plurality of stations 12 and for the optical signals inside the PG amplified by the station, and further obtains the partial optical SNR of path group.

At the sixth step, the arithmetic circuit 16 obtains the difference value between the average value of all optical signals in each of a plurality of stations and the partial optical SNR of path group, for each of a plurality of PG.

At the seventh step, the arithmetic circuit 16 obtains the sum of the difference values for each of a plurality of PG.

At the eighth step, the arithmetic circuit 16 regulates the partial optical SNR of path group so that the sums of the difference values obtained for a plurality of PG become all zero.

At the ninth step, the arithmetic circuit 16 regulates the optical levels of a plurality of optical signals according to the partial optical SNR of path group so regulated.

Pre-emphasis inside the PG in the ninth step can be determined by using expressions (1) and (2), but a pre-emphasis method between two terminal stations can be employed inside PG as follows.

At the first step, the average value of the optical SNR is obtained for all the channels in the station 12 (the optical sending station 14) in which all the channels of PG are dropped.

At the second step, the difference between this average value and the optical SNR of the channel ch.1 in this station 12 (the optical sending station 14) is calculated.

At the third step, the station 12 (the optical sending station 10) to which all the channels of PG are added, adds or drops the optical level for compensating the difference to or from the channel ch.1 and regulates the optical level of the channel ch.1.

At the fourth step, the second and third steps described above are performed for all the channels inside PG.

Pre-emphasis inside PG may be also performed in the following way.

Figure 2B:
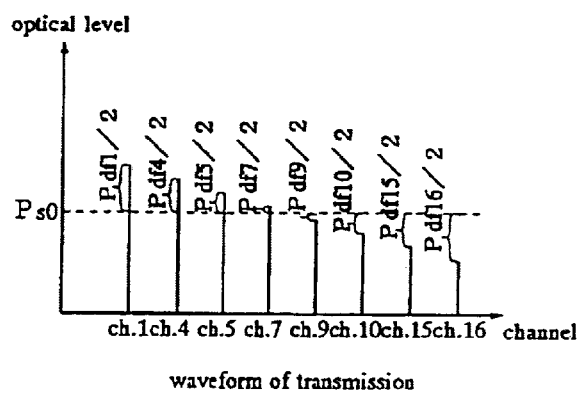
FIG. 2B shows a transmission PG when pre-emphasis is made on the basis of FIG. 2A.

An example of pre-emphasis inside PG will be explained with reference to FIG. 2. The ordinate of each diagram represents the optical level and the abscissa does the channel (wavelength). FIG. 2 shows the case where PG comprises ch.1, ch.4, ch.5, ch.7, ch.9, ch.10, ch.15 and ch.16, but pre-emphasis can be likewise performed inside PG for all the combinations of the channels in PG.

To simply execute pre-emphasis, deviation from the average value of the optical levels of reception PG is set to ½, and upon the reverse of the size of spectra, the deviation ½ is in increase or decrease as the pre-emphasis quantity of transmission PG.

At the first step, PG is transmitted to the optical communication system under the state where pre-emphasis is not applied (under the state where the optical level of each channel and the average value of the optical level of transmission PG coincide with each other), and the spectrum of reception PG is measured.

At the second step, deviation Pdf from the average value of the optical level of reception PG is calculated for each channel by using the spectrum of reception PG so measured, and ½ of the resulting value is calculated (Pdf/2).

At the third step, Pdf/2 is added to the channels having the optical level of reception PG smaller than the average value of the optical levels of reception PG, and subtracts Pdf/2 from the channels having the optical level of reception PG greater than the average value of the optical levels of reception PG. In the case shown in FIG. 2, the channel ch.1 has the optical level smaller than the average value of the optical levels of reception PG. Therefore, Pdf1/2 is added to the average value of the optical levels of transmission PG. The channel ch.16 has the optical level greater than the average value of the optical levels of reception PG. Therefore, Pdf16/2 is subtracted from the average values of the optical level of transmission PG.

In this way, pre-emphasis inside PG can be performed.

As described above, the optical communication system shown in FIG. 1 can pre-emphasize the WDM optical signal. Whether or not expression (1), (3) or (6) is used as partial optical SNRj,k depends on the bit error rate required for the optical communication system, and so forth.

Next, another embodiment will be explained.

Construction of Second Embodiment

The second embodiment relates to an optical communication system according to the present invention.

First, explanation will be given on the overall construction of the optical communication system according to the second embodiment, and then on the construction of each of an optical sending station, a repeater amplifying apparatus, OADM (optical add/drop multiplexer) and an optical receiving station in detail.

The overall construction of the optical communication system according to the present invention is as follows.

Figure 3A:
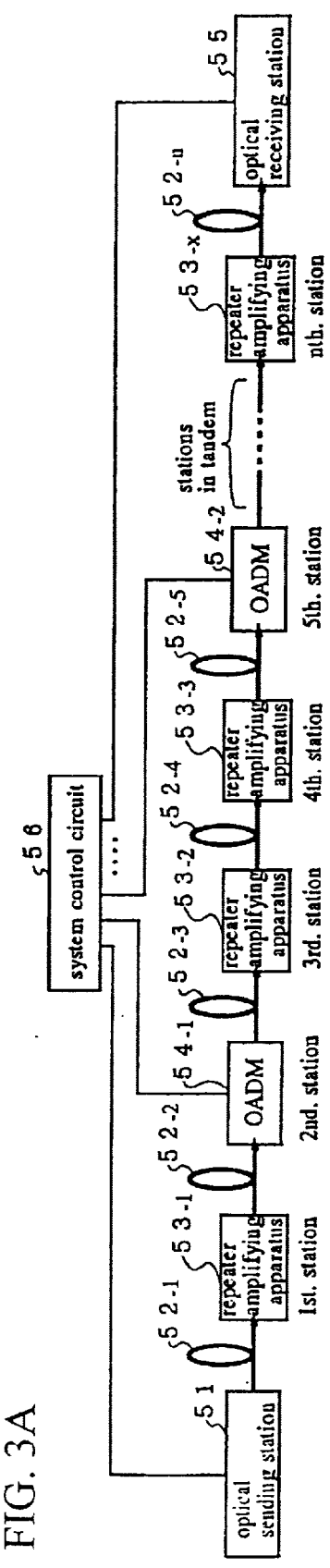
FIG. 3A shows a construction of an optical communication system according to the second embodiment.

As shown in FIG. 3A, the optical communication system according to the second embodiment includes an optical sending station 51, repeater amplifying apparatuses 53, OADM 54, an optical receiving station 55, optical transmission lines 52 for connecting these stations and transmitting optical signals, and a system control circuit 56.

The optical sending station 51 generates optical signals of 32 channels, pre-emphasizes each channel according to the control signal outputted from the system control circuit 56, converts the optical signals to a WDM optical signal and transmits it to the optical transmission lines 52.

The repeater amplifying apparatus 53 amplifies the WDM optical signal transmitted through the optical transmission line 52.

OADM 54 adds/drops/passes the predetermined channels from the WDM optical signal transmitted through the optical transmission line 52. OADM 54 outputs the spectrum of the WDM optical signal inputted to OADM 54 and the spectrum of the WDM optical signal outputted from OADM 54 to the system control circuit 56, pre-emphasizes each channel to be added according to the control signal outputted from the system control circuit 56 and adds the channel to the optical transmission line 52.

The optical receiving station 55 receives and processes the WDM optical signal, and outputs the spectrum of the WDM optical signal inputted to the optical receiving station 55 to the system control circuit 56.

The repeater amplifying apparatus 53 and OADM 54 are interposed between the optical sending station 51 and the optical receiving station 55. OADM 54 is disposed in accordance with points at which the channels are to be dropped/added from/to the WDM optical signal. A required number of repeating amplifying apparatuses 53 are disposed in accordance with the transmission loss between the optical sending station 51 and OADM 54, among OADM 54 in an optical communication system equipped with a plurality of OADM 54 and between OADM 54 and the optical receiving station 55, and between these stations.

Next, the construction of the optical sending station used for the optical communication system according to the second embodiment will be explained in detail.

In FIG. 4, the optical sending station 51 comprises a laser diode (LD) 101, a modulator (MOD) 102, an optical variable attenuator (VAT) 103, a WDM coupler (W-CPL) 104, an optical amplifier 108, a coupler (CPL) 105, a spectrum analyzer (SPA) 106 and an optical sending station control circuit 107.

The laser diode LD 101 oscillates laser beams of a predetermined wavelength. The laser beams so oscillated are outputted to corresponding MOD 102-1 to 102-32, respectively. Various lasers such as a Fabry-Perot resonating laser, a distributed feedback laser, a distributed Bragg reflector laser, and so forth, can be used for the LD 101.

The modulator MOD 102 modulates the laser beam from LD 101 by information to be sent and generates an optical signal. The resulting optical signal is outputted to VAT 103. An external modulation type modulator such as a Mach-Zehnder interferometer and a semiconductor field absorption type optical modulator can be utilized for MOD 12.

When direct modulation for changing the optical level of the oscillating laser beam is executed by superposing the driving current of LD 101 with a modulation signal based on information to be sent, the optical sending station 51 can omit MOD 102.

The optical variable attenuator VAT 103 attenuates the optical level of the optical signal from MOD 102 and then outputs it to the WDM coupler 104. The attenuation quantity is controlled by a control signal from the optical sending station control circuit 107.

Thirty-two (32) sets of the construction comprising LD 101, MOD 102 and VAT 103 are prepared in match with the number of the channels of the WDM optical signal. Each LD 101-1 to 101-32 oscillates the laser beam having a wavelength coincident with the wavelength of the corresponding channel. For example, LD 101-1 oscillates the wavelength corresponding to the wavelength of the channel ch.1, and LD 101-2 oscillates the wavelength corresponding to the wavelength of the channel ch.2.

From the aspect of further stabilization of the oscillation wavelength of LD 101, the driving current of the LD 101/chip temperature may be controlled, too. A wavelength locker comprising a periodic filter may also be interposed between LD 101 and MOD 102.

The WDM coupler 104 wavelength-multiplexes each optical signal outputted from each VAT and generates a WDM optical signal. The WDM optical signal so generated is outputted to the coupler 105 through an optical amplifier 108 for amplifying light.

The coupler 105 branches the WDM signal from the optical amplifier 108 into two signals. One of the branched WDM optical signals is outputted to the optical transmission line 52-1 and is transmitted to the station of the next stage. The other branched WDM optical signal is outputted to the SPA 106.

The spectrum analyzer SPA 106 measures the wavelength of the input light and the optical level at this wavelength. SPA 106 measures the spectrum of the WDM optical signal transmitted from the optical sending station 51 and outputs its measurement result to the optical sending station control circuit 107.

The optical sending station control circuit 107 outputs the measurement result from SPA 106 to the system control circuit 56. The optical sending station control circuit 107 regulates the attenuation quantity of each VAT 103-1 to 103-32 according to the control signal from the control circuit 56, and thus pre-emphasis each WDM optical signal. The optical sending station control circuit 107 judges whether or not the WDM optical signal is pre-emphasized as described above on the basis of the measurement result from SPA 106, and control the attenuation quantity of each VAT 103-1 to 103-32.

Next, the construction of the optical receiving station used in the optical communication system according to the second embodiment will be explained.

In FIG. 5, the optical receiving station 55 comprises an optical amplifier 118, a coupler 111, an SPA 112, an optical receiving station control circuit 113, a WDM coupler 114, an optical filter (FIL) 115, an optical amplifier 116 and a demodulator (DEM) 117.

The optical amplifier 118 amplifies the WDM optical signal inputted from the optical transmission line 52-n connected to the optical receiving station 55 and compensates the loss occurring in the optical transmission line 52-n.

The coupler 111 branches the WDM optical signal from the optical amplifier 118 into two signals. One of branched the WDM optical signals is outputted to the WDM coupler 114 and the other to SPA 112.

The WDM coupler 114 demultiplexes the wave of the WDM optical signal from the coupler 111 in accordance with the wavelength corresponding to each channel. The optical signal of each channel after this wavelength division is outputted to each FIL 115-1 to 115-32.

The filter FIL 115 is a band-pass filter that passes light of a predetermined wavelength band. A fiber grating filter (FBG) or a dielectric multi-layer optical filter, for example, can be employed for this filter FIL 115. This filter FIL 115 can be omitted when the WDM coupler 114 can separate light of the predetermined wavelength band with high accuracy.

To compensate the losses occurring in the coupler 111, the WDM coupler 114 and FIL 115, the optical amplifier 116 amplifies the optical signal from FIL 115 at a predetermined gain and outputs the amplified optical signal to DEM 117.

The demodulator DEM 117 demodulates the optical signal from the optical amplifier 116.

Thirty-two (32) sets of the constructions comprising FIL 115, the optical amplifier 116 and DEM 117 are prepared in such a manner as to correspond to the number of channels of the WDM optical signal. Each filter FIL 115-1 to 115-32 is set to a transmission wavelength band in match with the wavelength of the corresponding channel. As to FIL 115-1, for example, the center wavelength of the transmission wavelength band is aligned with the wavelength corresponding to the wavelength of the channel ch.1. Similarly, as to the filter FIL 115-2, the center wavelength of the transmission wavelength band is aligned with the wavelength corresponding to the wavelength of the channel ch.2.

The spectrum analyzer SPA 112 measures the spectrum of the WDM optical signal inputted to the optical receiving station 55 and then outputs the measurement result to the optical receiving station control circuit 113.

The optical receiving station control circuit 113 outputs the measurement result from SPA 112 to the system control circuit 56.

Next, the construction of the repeating amplifying apparatus used for the optical communication system according to the second embodiment will be explained.

Figure 6:
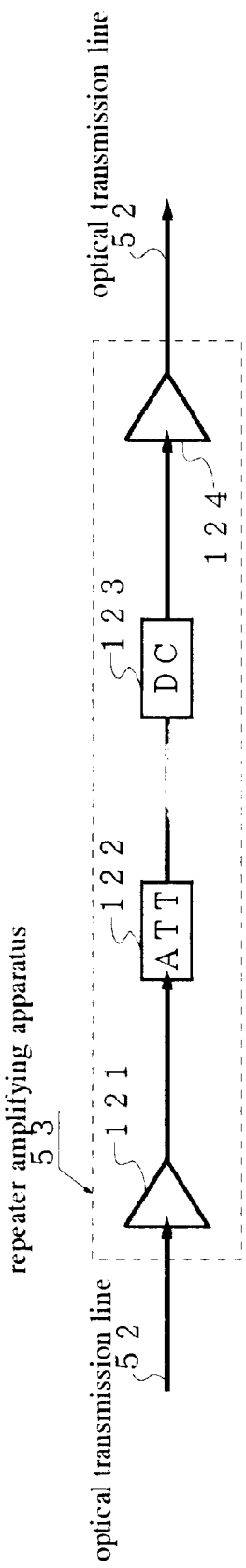
FIG. 6 shows a construction of an optical repeater amplifying apparatus in the optical communication system according to the second embodiment.

Referring to FIG. 6, the repeating amplifying apparatus 53 comprises optical amplifiers 121 and 124, an optical attenuator (ATT) 122 and a dispersion compensator (DC) 123.

The optical amplifier 121 is a pre-amplifier that raises a reception light level. This amplifier 121 amplifies the WDM optical signal outputted from the optical transmission line 52 connected to the repeater amplifying apparatus 53 and then outputs the signal to ATT 122.

The attenuator ATT 122 is an optical attenuator that outputs light at a predetermined attenuation ratio relative to input light. After being attenuated to a predetermined optical level, the WDM optical signal is outputted to DC 123. The WDM optical signal is attenuated to a predetermined optical level for the following reason. Namely, if the WDM optical signal having an excessively great optical level is as such inputted to DC 123, non-linear optical phenomena such as self-phase modulation and cross-phase modulation occur.

The dispersion compensator DC123 compensates the chromatic dispersion of the WDM optical signal occurring mainly in the optical transmission line 52. The WDM optical signal after compensation of this chromatic dispersion is outputted to the optical amplifier 124.

The optical amplifier 124 is a post-amplifier that amplifies output light of the repeating amplifying apparatus 53 to a predetermined optical level. The WDM optical signal so amplified is outputted to the optical transmission line so that it can be transferred to the station of the next stage.

When the optical amplifier 124 is an optical fiber amplifier, there is the possibility that the gain of the optical amplifier 124 is insufficient when the channels of the WDM optical signal are added after the optical communication system is constituted. To prepare for such a case, a booster pump source as a light source for supplementing the output optical level of a pump source may be provided in the optical amplifier 124.

Next, the construction of OADM (optical add/drop multiplexer) used for the optical communication system of the second embodiment will be explained in detail.

Figure 7:
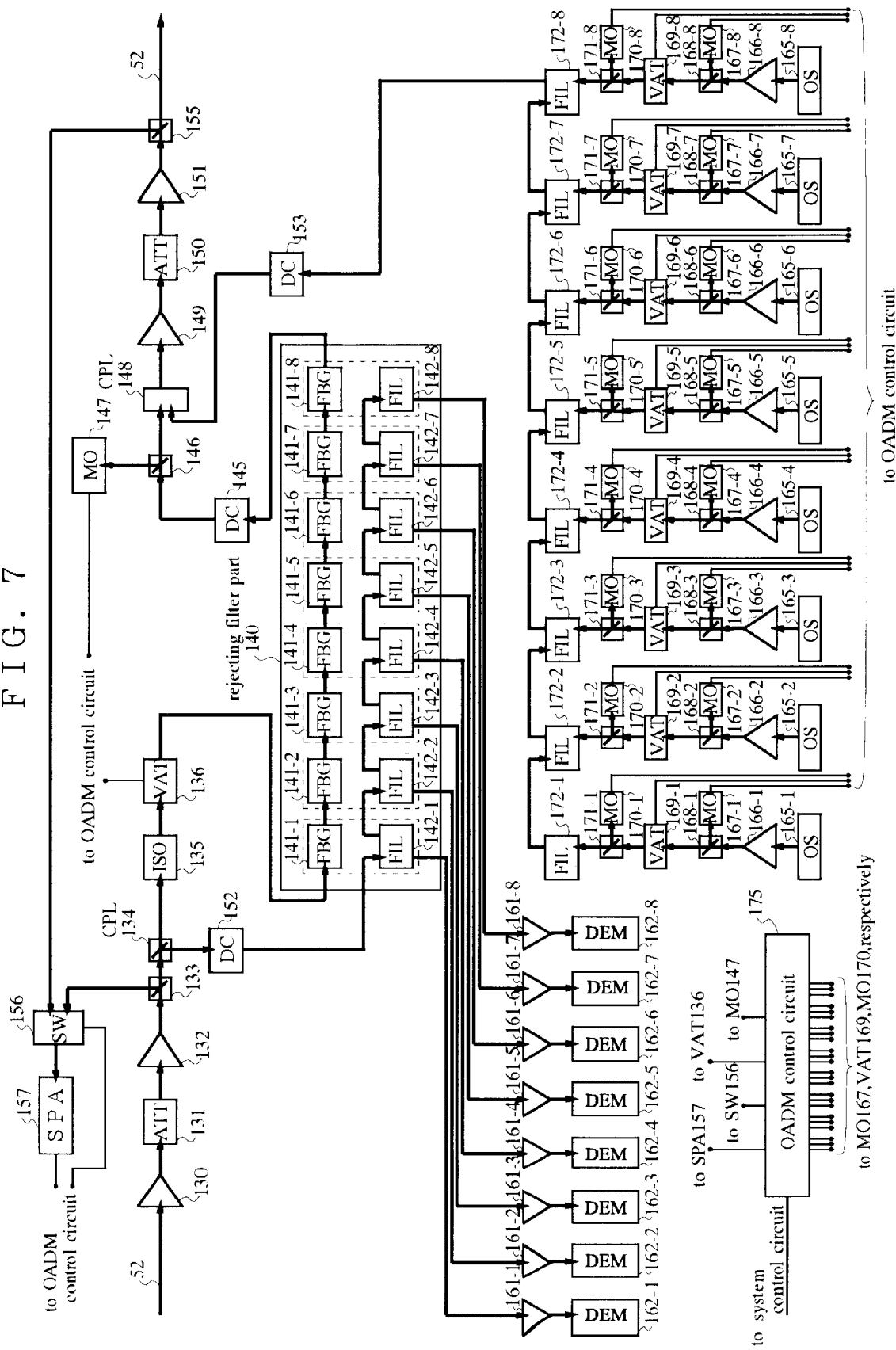
FIG. 7 shows a construction of OADM in the optical communication system according to the second embodiment.

Referring to FIG. 7, OADM 54 comprises optical amplifiers 130, 132, 149, 151, 161, 166, ATT 131, 150, couplers 133, 134, 146, 148, 155, 168, 171, an optical isolator (ISO) 135, VAT 136, 169, FBG 141, FIL 142, 172, DC 145, 152, 153, monitors (MO) 147, 167, 170, an optical switch (SW) 156, SPA 157, DEM 162, a transmitter 165 and an OADM control circuit 175.

The optical amplifier 130 is a pre-amplifier that, amplifies the WDM optical signal outputted from the optical transmission line connected to OADM 54 and then outputs the WDM optical signal to ATT 131. The optical amplifier 132 is a post-amplifier. The WDM optical signal so amplified is outputted to the coupler 133.

The optical amplifier 130, the attenuator ATT 131 and the optical amplifier 132 constitute a pre-stage amplifier part of OADM 54.

The coupler 133 branches the WDM optical signal outputted from the optical amplifier 132 into two signals. One of the branched WDM optical signals is outputted to the coupler 134 and the other to SW 156.

The coupler 134 branches the WDM optical signal outputted from the coupler 133 into two signals. One of the branched WDM optical signals is outputted to ISO 135 and the other to DC 152.

The WDM optical signal outputted to ISO 135 is processed by each of the later-appearing optical components and turns to the WDM optical signal that passes through OADM 54. On the other hand, the WDM optical signal, outputted to DC 152 is processed by each of the later-appearing optical components, and the channel dropped from OADM 54 is extracted.

The dispersion compensator DC 152 compensates the chromatic dispersion mainly occurring in the optical transmission line 52 for the channel dropped from OADM 54. The WDM optical signal after compensation of chromatic dispersion is outputted to a rejecting filter part 140.

The optical isolator ISO 135 is an isolator that passes light in only one predetermined direction, and allows light to pass in only one direction from the coupler 134 to VAT 136. Since light reflected by optical components inside OADM connected to ISO 135 and so forth can be thus cut off, ISO 135 prevents multiple reflection of light inside OADM. The isolator ISO 135 may have a construction in which a Farady rotator is interposed between two polarizers that deviate by 45 degrees from each other.

The variable optical attenuator VAT 136 attenuates the optical level of the WDM optical signal from ISO 135 and then outputs the WDM optical signal from ISO 135 to the rejecting filter part 140. The attenuation quantity is controlled by the control signal from the OADM control circuit 175.

In the rejecting filter part 140 has the FBG units prepared in the number of the channels of the optical signals that can be added and dropped to and from OADM 54. In this embodiment, eight FBG units are cascaded so that channels ch.1 to ch.8 can be dropped and added.

Each FBG unit comprises FBG 141 and FIL 142, and FBG 141 reflects only a predetermined wavelength band.

FIL 142 passes only a predetermined wavelength band. The reflection center wavelength of FBG 141 and the transmission center wavelength of FIL 142 are set to be equal to the wavelength of the channels to be dropped.

The rejecting filter part 140 shown in FIG. 7 represents the case where the channels ch.1 to ch.8 are dropped from the WDM optical signals of 32 waves. Since eight FBG units are cascaded, FBG 141-1 to FBG 141-8 are cascaded serially, and the filters FIL 142-1 to 142-8, too, are cascaded serially.

As shown in FIG. 7, the WDM optical signal of 32 waves from DC 152 is inputted to FIL 142-1. After only the channel ch.1 is allowed to pass through FIL 142-1, the WDM optical signal is outputted to the optical amplifier 161-1, and the channels ch.2 to ch.32 are reflected by FIL 142-1 and are outputted to FIL 142-2. After only the channel ch.2 is allowed to pass through FIL 142-2, the WDM optical signal inputted to FIL 412-2 is outputted to the optical amplifier 161-2, and the channels ch.3 to ch.32 are reflected by FIL 142-2 and are outputted to FIL 142-3. Similarly, the channels ch.3 to ch.8 are separated for each channel by each FIL 142-3 to 142-8, respectively, and are outputted to the optical amplifiers 161-3 to 161-8 connected to FIL 142-3 to 142-8, respectively.

The optical amplifier 161 is a pre-amplifier that amplifies the optical signal outputted from each FIL 142-1 to 142-8 and then outputs the optical signal to each DEM 162-1 to 162-8.

The demodulator DEM 162 demodulates the optical signal outputted from each optical amplifier 161-1 to 161-8 and takes out information of each channel.

On the other hand, the WDM optical signal of 32 waves from VAT 136 is inputted to FBG 14-1. Only the channel h.1 of the WDM optical signal is cut off by FBG 141-1 while the channels ch.2 to ch.32 are outputted to FBG 141-2. FBG 141-2 cuts off only the channel ch.2 of the WDM optical signal inputted to FBG 141-2 while the channels ch.3 to ch.32 are outputted to FBG 141-3. Similarly, each FBG 141-3 to 141-8 cuts off the channels ch.3 to ch.8, and the WDM optical signal outputted from FBG 141-8 comprises the channels ch.9 to ch.32.

The WDM optical signal outputted from FBG 141 of the last stage inside the rejecting filter part 140 is inputted to DC 145.

The dispersion compensator DC 145 compensates the chromatic dispersion occurring mainly in the optical transmission line 52 for the channels passing through OADM 54, and the WDM optical signal after compensation of chromatic dispersion is outputted to the coupler 146.

The coupler 146 branches the WDM optical signal from DC 145 into two signals. One of the branched WDM optical signals is inputted to MO 147 and the other to the WDM coupler 148.

MO 147 represents a monitor for detecting the optical level of the WDM optical signal. It comprises PD, for example, and the detection result is outputted to an OADM control circuit 175.

One of the functions of the OADM control signal 175 is to regulate the attenuation quantity of VAT 136 so that the detection result does not exceed a predetermined threshold value, on the basis of the detection result of MO 147. As the attenuation quantity is regulated in this way, the optical level of the WDM optical signal inputted to DC 145 can be limited. Therefore, nonlinear optical phenomena in DC 145 can be prevented.

On the other hand, the optical signal of the channel added in OADM 54 is generated by the later-appearing construction.

A transmitter 165 comprises LD and MOD and generates an optical signal having a predetermined wavelength. The optical signal so generated is outputted to an optical amplifier 166.

The optical amplifier 166 is a post-amplifier. The optical signal amplified is outputted to a coupler 168. The coupler 168 branches the optical signal from the optical amplifier 166 into two signals. One of the branched signals is outputted to MO 167 and the other branched optical signal, to VAT 169. The detection result of MO 167 is outputted to an OAMD control circuit 175.

The variable optical attenuator VAT 169 attenuates the optical level of the optical signal outputted from the coupler 168 and then outputs the signal to the coupler 171. The attenuation quantity is controlled by a control signal of the OADM control circuit 175.

The coupler 171 branches the optical signal outputted from VAT 169 into two signals. One of the branched optical signals is outputted to MO 170 and the other to FIL 172. The detection result of MO 170 is outputted to the OADM control circuit 175.

Another function of the OADM control circuit 175 is to regulate the attenuation quantity of VAT 136 on the basis of the detection result of MO 167 and MO 170, thereby regulating the optical level of the optical signal to a desired optical level. Since the attenuation quantity is regulated in this way, the optical level of the optical signal added in OADM 54 can be regulated. In consequence, optimum pre-emphasis can be achieved.

The construction comprising the transmitter 165, the coupler 169, MO 167, VAT 169, the coupler 171 and MO 170 is prepared for each channel to be added in OADM. To add the channels ch.1 to ch.8 in this embodiment, the constructions for generating the optical signals of these signals are prepared. The construction comprising the transmitter 165-1, the coupler 168-1, MO 167-1, VAT 169-1, the coupler 171-1 and MO 170-1 shown in FIG. 7, for example, generates the optical signal of the channel ch.1 of the WDM optical signal.

The filters FIL 172 are prepared in match with the number and channels of the optical signals to be added in OADM 54 and are serially cascaded. The transmission center wavelength of FIL 172 is set to the wavelength of the channel to be added.

FIG. 7 shows the case where the channels ch.1 to ch.8 are inserted from the WDM optical signal of 32 waves, and eight filters FIL 172-1 to 172-8 are serially cascaded.

As shown in FIG. 7, the channel ch. 1 outputted from FIL 172-1 is inputted to, and reflected by, FIL 172-2 and is then inputted to FIL 172-3 together with the channel ch.2 that passes through FIL 172-2. The channels ch.1 and ch.2 so inputted are reflected by FIL 172-3 and are inputted to FIL 172-4 together with the channel ch.3 passing through FIL 172-3. Similarly, the filters FIL 172-4 to 124-8 combine the channels ch.4 to ch.8, respectively, and FIL 172-8 finally outputs the WDM optical signal obtained by wavelength-multiplexing the channels ch.1 to ch.8. The WDM optical signal is inputted to DC 153.

The dispersion compensator DC 153 compensates chromatic dispersion that mainly occurs in the optical transmission line 52, for the channels added in OADM 54. The WDM optical signal after compensation of wavelength dispersion is outputted to a WDM coupler 148.

The WDM coupler 148 wavelength-multiplexes the WDM optical signal outputted from the coupler 146 and passing through OADM 54 with the WDM optical signal outputted from DC 153 and added in OADM 54. The WDM optical signal so wavelength-multiplexed is outputted to an optical amplifier 149. This optical amplifier 149 is a pre-amplifier. This pre-amplifier amplifies the WDM optical signal from the WDM coupler 148 so as to compensate the loss resulting from optical components inside OADM 54 and then outputs this signal to ATT 150.

The attenuator ATT 150 attenuates the WDM optical signal at a predetermined attenuation ratio and then outputs the signal to an optical amplifier 151. The optical amplifier 151 is a post-amplifier. The WDM optical signal so amplified is outputted to a coupler 155. The optical amplifier 149, ATT 150 and the optical amplifier 151 constitute a post-stage amplification part in OADM 54.

The coupler 155 branches the WDM optical signal outputted from the optical amplifier 151 into two signals. One of the branched WDM optical signals is outputted to the optical transmission line 52 so that it can be transmitted to the station of the next stage. The other branched WDM optical signal is outputted to SW 156.

The switch SW 156 represents a 2×1 optical switch. This optical switch SW 156 outputs either one of the WDM optical signal outputted from the coupler 133 and the WDM optical signal outputted from the coupler 155 to SPA 157 in accordance with a control signal of the OADM control circuit 175.

The spectrum analyzer SPA 157 measures the spectrum of the WDM optical signal outputted from the pre-stage amplification part or the spectrum of the WDM optical signal outputted from the post-stage amplification part depending on the selection of SW 156, and outputs the measurement result to the OADM control circuit 175.

Another function of the OADM control circuit 175 is to output to SW 156 a control signal for controlling which of the WDM optical signal from the coupler 133 to SPA 157 and the WDM optical signal from the coupler 155 is to be outputted, in accordance with the control signal of the system control circuit 56. The OAMD control circuit 175 regulates the attenuation quantity of each VAT 169-1 to 169-32 and VAT 136 according to the control signal of the system control circuit 56 and pre-emphasizes the channel to be added.

It is possible to utilize for VAT 103, 136 and 169 a variable optical attenuator produced by vacuum evaporating a metal film, the thickness of which is continuously changed in a rotating direction, on the surface of an attenuation disc and regulating the attenuation quantity by rotating this attenuation disc, or a variable optical attenuator produced by inserting a polarizer between input light and output light into a magneto-optic crystal and on the output side of this magneto-optic crystal, and regulating the attenuation quantity by changing the intensity of a magnetic field when the magnetic field is applied to the magneto-optic crystal.

The WDM couplers 104, 114 and 148 can use a dielectric multi-layer optical filter or an arrayed wave-guide grating optical multi/demultiplexer, for example.

The couplers 105, 111, 133, 134, 146, 155, 168 and 171 can use a micro-optical chip type optical drop/coupler such as a half mirror, an optical fiber type optical drop/coupler such as a molten fiber or a arrayed wave-guide optical drop/coupler, for example.

The optical amplifiers 116, 121, 124, 130, 132, 149, 151, 161 and 166 can utilize a semiconductor laser amplifier or an optical fiber amplifier, for example.

The demodulators DEM 117 and 162 can utilize a light reception device such as a photo-diode that converts optical signals to electric signals.

The dispersion compensators DC 123, 145, 152 and 153 can utilize a dispersion compensation fiber having a dispersion value of an opposite sign for compensating the dispersion occurring in the WDM optical signal.

As described above, the optical communication system according to the second embodiment may have the function of regulating the optical level of each channel of the WDM optical signal in addition to the function of generating the WDM optical signal.

The optical receiving station applied to the optical communication system according to the second embodiment may has the function of measuring the optical level of each channel of the WDM optical signal inputted to the optical sending station in addition to the function of receiving and processing the WDM optical signal.

The repeater amplifying apparatus applied to the optical communication system according to the second embodiment may have the function of measuring the optical level of each channel of the WDM optical signal inputted to OADM, the function of measuring the optical level of each channel of the WDM optical signal outputted from OADM and the function of regulating the optical levels of the channels to be added and the channels to be passed, besides the function of branching, inserting and passing the predetermined channels from the WDM optical signal.

Function and Effect of the Second Embodiment

Next, pre-emphasis in the optical communication system according to the second embodiment will be explained.

First, when the optical communication system according to the second embodiment, shown in FIGS. 3 to 7, is activated, the constituent devices are serially activated from the upstream side of the optical communication system, that is, from the optical sending station 51 to the optical receiving station 55.

Confirmation as to whether the signal reaches each device, ASE compensation, confirmation of the limit of the input optical level of DC and slope compensation for wavelength dependence of the loss of the transmission line are executed for each constituent device.

The optical sending station 51 and OADM 54 transmit all the channels of the WFM optical signal. The optical sending station 51 sets the optical level of each channel to be transmitted to substantially equal to one another. OADM 54 sets the optical level of each channel to be added to substantially equal to one another and to substantially equal to the average optical level of the channel passing through OADM 54.

In OADM 54, whether or not the average optical level inputted to the post-stage amplification part is above a predetermined value is confirmed from all the optical levels inputted to the amplifier 149, the ASE correction quantity of the pre-stage amplification part and the number of channels.

After initial setting is made as described above for each constituent device, the optical communication system according to the second embodiment is pre-emphasized in the following procedure.

Broadly speaking, this pre-emphasis comprises generating path groups PG, executing pre-emphasis between PG and then executing pre-emphasis inside PG.

Pre-emphasis inside PG is achieved as the sum of the difference between the average value of all the optical signals and partial optical. SNR of path group j,k is kept within the allowable value, preferably at about 0, in each station. As explained with reference to FIG. 2, pre-emphasis is performed inside PG by calculating the deviation of PG from the average value of the optical levels for each channel of PG in the dropping station, and adding or subtracting ½ of this deviation to or from each channel as the pre-emphasis quantity when PG is added to the optical transmission line 52 after the size relationship among the spectra is reversed.

Pre-emphasis in the second embodiment will be explained in detail with reference to FIGS. 8 to 10.

Figure 8:
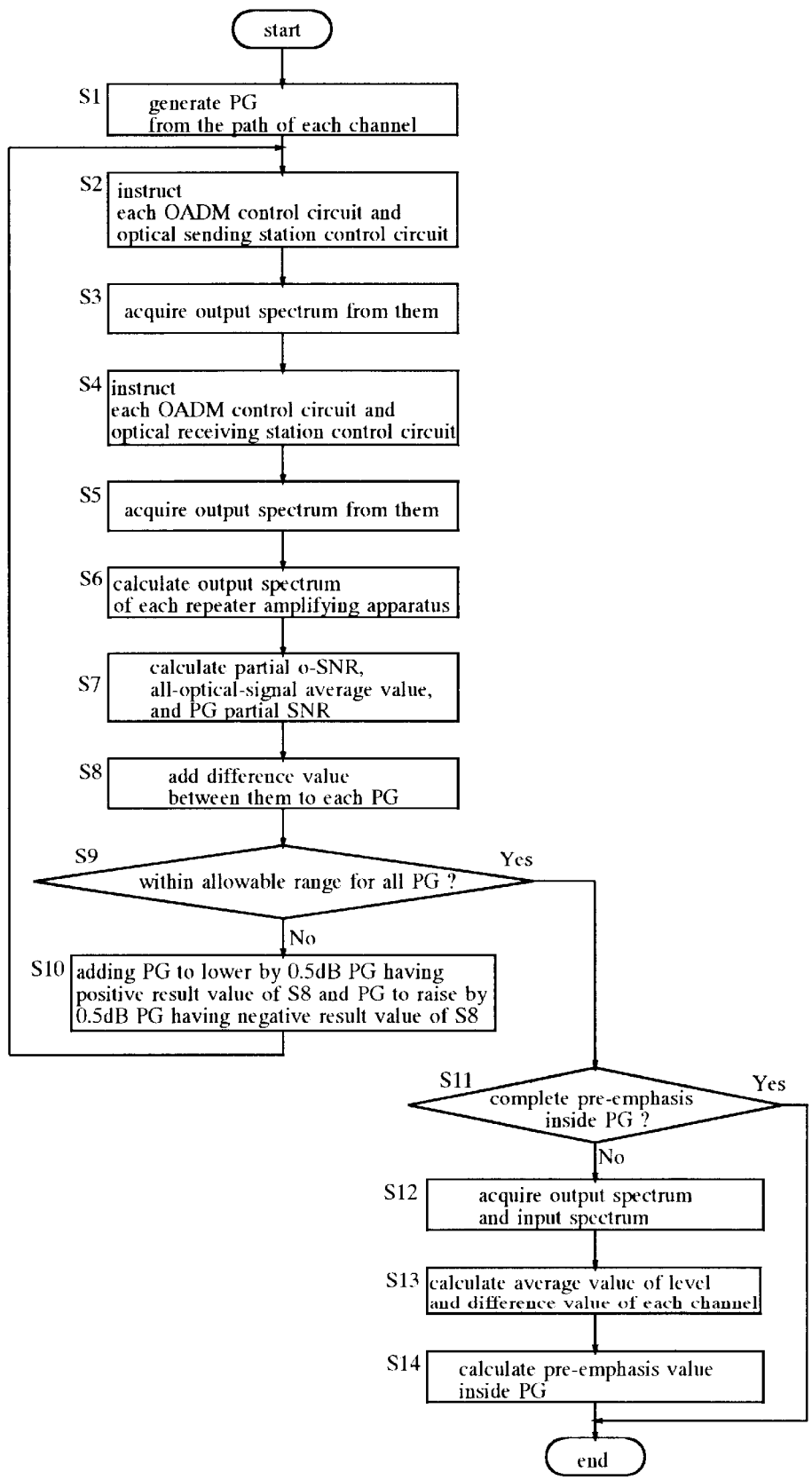
FIG. 8 is a flowchart of a system control circuit in the optical communication system according to the second embodiment.

The system control circuit 56 generates PG from the path of each channel in step S1 in FIG. 8.

Figure 3B:
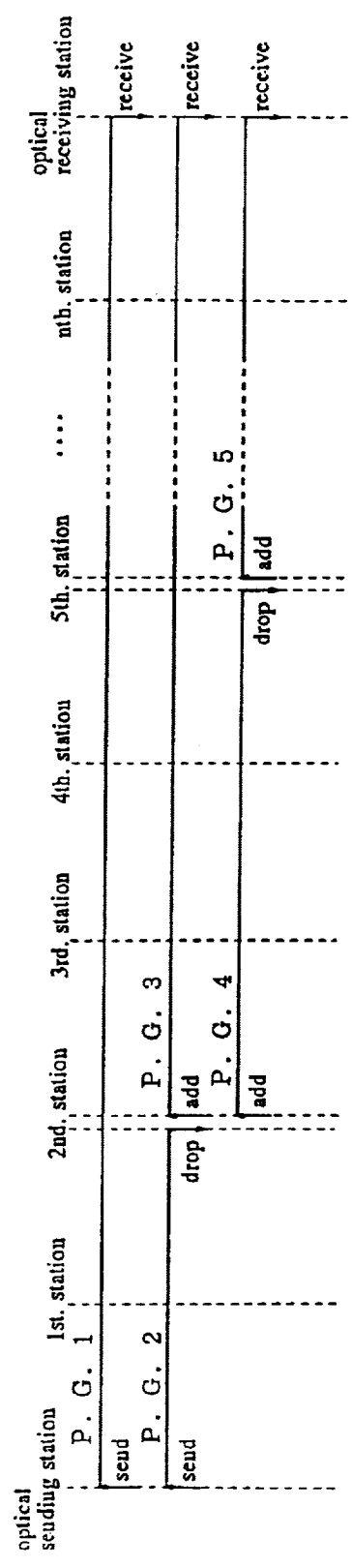
FIG. 3B shows PG in the optical communication system according to the second embodiment.

In this embodiment, the channels ch.1 to ch.16 sent from the optical sending station 51 and received by the optical receiving station 55 are collected to be PG1, for example, as shown in FIG. 3B. The channels ch.17 to ch.32 sent from the optical sending station 51 and dropped in the station 2 of OADM 54-1 are collected to be PG2. The channels ch.17 to ch.24 added from the station 2 of OADM 54-1 and received by the optical receiving station 55 are collected to be PG3. The channels ch.25 to ch.32 added from the station 2 of OADM 54-1 and dropped by the station 5 of OADM 54-2 are collected to be PG4. The channels ch.25 to ch.32 added from the station 5 of OADM 54-2 and received by the optical receiving station 55 are collected to be PG5.

In step S2 in FIG. 8, the system control circuit 56 instructs each OADM control circuit 175 to output the output spectrum of the post-stage amplification part in each OADM. The system control circuit 56 instructs also the optical sending station control circuit 107 to output the output spectrum.

Figure 9:
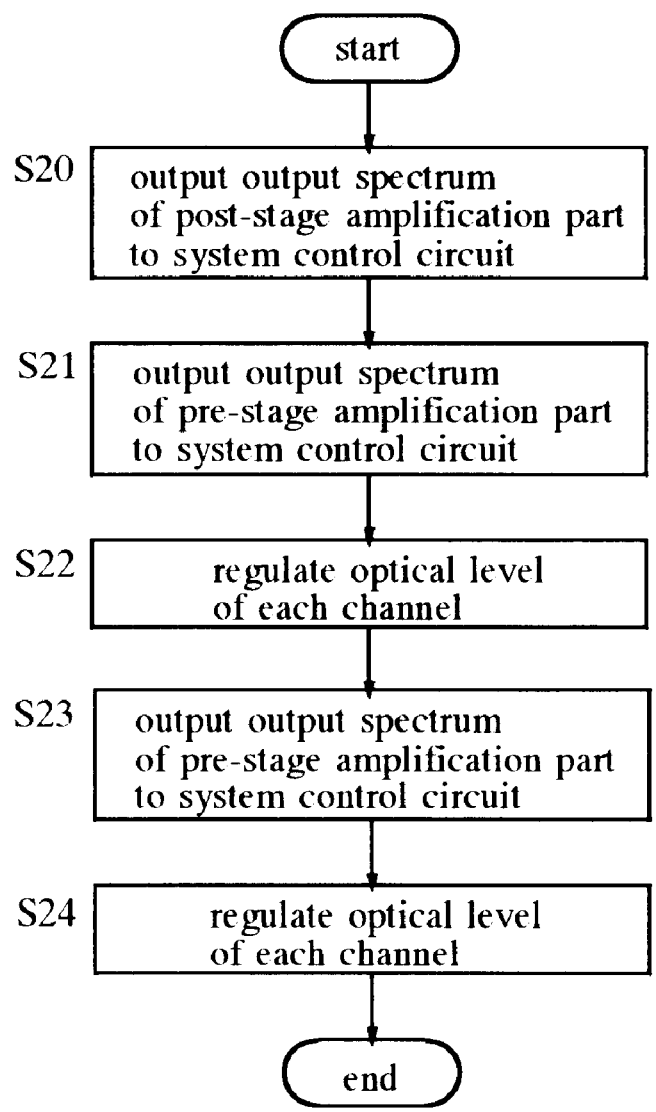
FIG. 9 is a flowchart of an OADM control circuit in the optical communication system according to the second embodiment.

In step 20 in FIG. 9, the OADM control circuit 175 in the station of each OADM receives the instruction from the system control circuit 56 and changes over SW 156 so as to input light outputted from the coupler 155 to SPA 157. Each OADM control circuit 175 outputs SPA (the output spectrum of the post-stage amplification part) to the system control circuit 56.

The optical sending station control circuit 107 outputs the output of SPA 106 (the output spectrum) to the system control circuit 56.

In step S3 in FIG. 8, the system control circuit 56 acquires the output spectrum of the post-stage amplification part in each OADM from each OADM control circuit 175. The system control circuit 56 further acquires the output spectrum from the optical sending station control circuit 107.

In step S4 in FIG. 8, the system control circuit 56 instructs each OADM control circuit 175 to output the output spectrum of the pre-stage amplification part in each OADM 54. The system control circuit 56 further instructs the optical receiving station control circuit 113 to output the input spectrum.

In step S21 in FIG. 9, the OADM control circuit 175 in each OADM station changes over SW 156 so as to input light outputted from the coupler 133 to SPA 157 upon receiving the instruction from the system control circuit 56. Each OADM control circuit 175 outputs the output of SPA 157 (the output spectrum of the pre-stage amplification part) to the system control circuit 56.

The optical receiving station control circuit 113 outputs the output of SPA 112 (the input spectrum) to the system control circuit 56.

In step S5 in FIG. 8, the system control circuit 56 acquires the output spectrum of the pre-stage amplification part in each OADM from each OADM control circuit 175. The system control circuit 56 acquires the input spectrum from the optical receiving station control circuit 113.

Here, when the optical amplifier inside OADM compensates the slope for wavelength dependence of the loss of the transmission line, the slope compensation quantity for compensating the equalization gain is subtracted from the output spectrum of the post-stage amplification part and from the output spectrum of the pre-stage amplification part in steps S3 and S5, respectively, in order to determine the output spectrum of the post-stage amplification part as well as the output spectrum of the pre-stage amplification part when gain equalization is not made, and to set them afresh to the output spectrum of the post-stage amplification part and the output spectrum of the pre-stage amplification part, respectively.

In step S6 in FIG. 8, the system control circuit 56 calculates the output spectrum of each repeater amplifying apparatus 53 in the following way.

The repeating amplifying apparatus 53 is not equipped with averages for measuring the output spectrum as explained with reference to FIG. 6. Therefore, the difference is calculated between the average value of the output spectra of the post-stage amplification part of the post-stage amplification part in OADM 54, that is the closest to, and ahead of, the repeating amplifying apparatus 53 the output spectrum of which is to be determined, and the average value of the output spectra of the post-stage amplification part in OADM 54, that is the closest to, and at the back of, the repeating amplifying apparatus 53. The output spectrum of this repeating amplifying apparatus 53 is assumed hereby as the sum obtained by adding ½ of this difference to the output spectrum of the post-stage amplification part that is the closest to, and ahead of, the repeating amplifying part.

Incidentally, when the closest forward apparatus is not OADM 54 but is the optical sending station 51, the average value of the output spectra of the optical sending station 51 may be used. When the closest rear apparatus is not OADM 54 but is the optical receiving station 55, the average value of the input spectra of the optical receiving station 55 may be used.

Since the first station is the repeating amplifying apparatus 53-1 in this embodiment, the output spectrum of the first station shown in FIG. 3A, for example, is obtained by calculating the difference between the average value of the output spectra of the forward optical sending station 51 and the average value of the output spectra of the pre-stage amplification part in the rear OADM 54-1 and adding ½ of this difference to the output spectrum of the forward optical sending station.

When a plurality of repeater amplifying apparatuses exist between two OADM 54, the difference is calculated between the average value of the output spectra of the post-stage amplification part in the closest forward OADM 54 and the average value of the output spectra of the pre-stage amplification part in the closest rear OADM 54 for a plurality of repeater amplifying apparatuses 53 for which the output spectra are desired to be obtained. The difference so obtained is divided by the sum of the number of the repeater amplifying apparatuses existing between the two OADM 54 and 1, that is, the number of spans of the optical transmission line 52 existing between the two OADM 54 to determine the change quantity per repeater amplifying apparatus. The output spectrum of the nth repeater amplifying apparatus 53 interposed between two OADM 54 is the sum of the output spectrum of the post-stage amplification part in the closest forward OADM 54 and n multiples of the change quantity. When five repeater amplifying apparatuses 53 exist, for example, the output spectrum of the first repeater amplifying apparatus 53 is the sum of the output spectrum of the post-stage amplification part in the closest forward OADM 54 and the product obtained by multiplying the change quantity by 1. The output spectrum of the fourth repeater amplifying apparatus 53 is the sum of the output spectrum of the post-stage amplification part in the closest forward OADM 54 and the product obtained by multiplying the change quantity by 4.

In the second embodiment, as to the output spectra of the third and fourth stations shown in FIG. 3A, for example, the difference is calculated between the average value of the output spectra of the post-stage amplification part in the forward OADM 54-1 and the average value of the output spectra of the pre-stage amplification part in the rear OADM 54-2 because two repeating amplifying apparatuses 54 exist between two OADM 54-1 and 54-2. The difference value is then divided by 3 that is the sum of the number of the repeater amplifying apparatuses and 1 to obtain the change quantity per repeater amplifying apparatus. The output spectrum of the third station is the sum obtained by adding the product of the change quantity by 1 to the output spectrum of the post-stage amplification in the first OADM 54-1 because the third station is the first repeater amplifying apparatus. The output spectrum of the fourth station is the sum of the output spectrum of the post-stage amplification part in the forward OADM 54-1 and the product of the change quantity by 2 because the fourth station is the second repeater amplifying apparatus.

As described above, the second embodiment can calculate the output spectrum of the repeater amplifying apparatus 52 and can therefore eliminate the measuring part. The repeater amplifying apparatus may further comprise a spectrum analyzer for measuring output light of the optical amplifying apparatus 124 and a built-in repeater amplifying apparatus control circuit for outputting the output of this spectrum analyzer to the system control circuit 56 so as to measure the output spectrum of the repeater amplifying apparatus 52.

The system control circuit 56 thus acquires the spectrum of the WDM optical signal in the optical sending station, each station and the optical receiving station 55.

In step S7 in FIG. 8, the system control circuit 56 calculates the partial optical SNR j of each station, the all-optical-signal average value and the partial SNR of path group. In the second embodiment, the partial optical SNRj,k is defined as Poutj,k, and Poutj,k is calculated from each spectrum acquired in steps S3, S5 and S6.

Therefore, the all-optical-signal average value is calculated by summing Poutj,k for all the channels in each station and calculating the average value. The partial optical SNR of path group is calculated by summing Poutj,k for the optical signals inside PG amplified in each station, for each PG in each station, and calculating the average value.

The all-optical-signal average value in the third station, for example, is acquired by summing Pouj,3 for the channels ch.1 to ch.32 amplified in the third station and calculating the average value. The partial optical SNR of path group for the PG1 is acquired by summing Poutj,3 for the channels ch.1 to ch.16 and calculating the average value. In PG 2, it is acquired by summing Poutj,3 for the channels ch.17 to ch.24 and calculating the average value. In PG3, the partial optical SNR is acquired by summing Poutj,3 for the channels ch.25 to ch.32 and calculating the average value.

Since Poutj,k is thus used, the spatial analyzer SPA 157 does not need to measure ASE between the channels.

Therefore, SPA 157 can use an economical spectrum analyzer having a simple construction.

In step S8 in FIG. 8, the system control circuit 56 calculates the difference between the all-optical-signal average value and the partial optical SNR of path group in each station. The system control circuit 56 adds together the difference for each station calculated for all the stations to which the all-optical-signal average value is inputted.

Instep S9 in FIG. 8, the system control circuit 56 judges whether or not the sum obtained in step S8 is within the allowable range for all PG.

This allowable value is the one that decides accuracy in pre-emphasis between PG and depends on the bit error rate required for the optical communication system, and so forth. When this allowable range is set substantially to 0, the optical communication system has a low bit error rate and can make ultra-long distance communication.

As shown in FIG. 2, the second embodiment assumes the optical sending station as the $0^{th}$ station and the optical receiving station 55 as n+1-th station. Assuming further that the all-optical-signal average value in each k station is Poutav,k and the partial optical SNR of path group as Poutg α,k, step S9 is directed to simultaneously satisfy expression (8):

$$(Poutg1, 0 - Poutav, 0) + (Poutg1, 1 - Poutav, 1) + \quad (8)$$
$$(Poutg1, 2 - Poutav, 2) + (Poutg1, 3 - Poutav, 3) +$$
$$(Poutg1, 4 - Poutav, 4) + (Poutg1, 5 - Poutav, 5) +$$
$$\ldots + (Poutg1, n - Poutav, n) + (Poutg1, n + 1 - Poutav,$$
$$n + 1 - Poutav, n + 1) \leq \text{(allowable value)}$$
$$(Poutg2, 0 - Poutav, 0) + (Poutg2, 1 - Poutav, 1) +$$
$$(Poutg2, 2 - Poutav, 2) \leq \text{(allowable value)}$$
$$(Poutg3, 3 - Poutav, 3) + (Poutg3, 4 - Poutav, 4) +$$
$$(Poutg3, 5 - Poutav, 5) + \ldots + (Poutg3, n - Poutav, n) +$$
$$(Poutg1, n + 1 - Poutav, n + 1 - Poutav, n + 1) \leq$$
$$\text{(allowable value)}$$
$$(Poutg4, 2 - Poutav, 2) + (Poutg4, 3 - Poutav, 3) + (Poutg4,$$
$$4 - Poutav, 4) + (Poutg5, 5 - Poutav, 5) \leq \text{(allowable value)}$$
$$(Poutg5, 5 - Poutav, 5) + \ldots + (Poutg5, n - Poutav, n) +$$
$$(Poutg1, n + 1 - Poutav, n + 1) \leq \text{(allowable value)}$$

When the system control circuit 56 judges that the sum obtained in step S8 is out of the allowable range, it executes step S11 in FIG. 8.

In step S10 in FIG. 8, the system control circuit 56 instructs the OADM control circuit 175 of OADM 54 for adding PG to lower by 0.5 dB PG having a positive result value of step S8 and to raise by 0.5 dB PG having a negative result value of S8 in OADM for adding PG. The smaller the width of this regulation amount, the higher becomes accuracy of pre-emphasis.

In step S22 in FIG. 9, the OADM control circuit 175 regulates the optical level of each channel by using VAT 169 in accordance with the instruction from the system control circuit 56. The OADM control circuit 175 confirms the regulation result from the output of MO 167 and 170 and regulates VAT 136 and 169 so as to attain a target optical level. The OADM control circuit 175 outputs the end of regulation to the system control circuit 56.

Confirming the end of regulation, the system control circuit 56 returns the process to step S2 in FIG. 8 and executes steps S2 to S9.

In step S11 in FIG. 8, on the other hand, the system control circuit 56 judges whether or not pre-emphasis inside PG is completed. When pre-emphasis is not completed, the system control circuit 56 executes step S12 in FIG. 8 and when it is finished, the system control circuit 56 finishes the pre-emphasis step.

In step S12 in FIG. 8, the system control circuit 56 instructs each OADM control circuit 175 to output the output spectrum of the pre-stage amplification part in each OADM 54. The system control circuit 56 instructs the optical receiving station control circuit 113 to output the input spectrum.

In step S23 in FIG. 9, the OADM control circuit 175 of the station of each OADM receives the instruction from the system control circuit 56 and changes over SW 156 so that light from the coupler 133 can be inputted to SPA 157. Each OADM control circuit 175 outputs the output of SPA 157 (the output spectrum of the pre-stage amplification part) to the system control circuit 56.

The optical receiving station control circuit 113 outputs the output of SPA 112 (the input spectrum) to the system control circuit 56.

In S13 in FIG. 8, the system control circuit 56 calculates the average value of only the optical levels to be dropped for each PG in accordance with the result of S12, and calculates the optical level of the channel and its deviation from the average value for each channel in each PG.

In step S14 in FIG. 8, the system control circuit 56 reverses the size relationship between the spectra and adds or subtracts the ½ deviation amount to or from each channel as the pre-emphasis amount of each channel in PG. The system control circuit 56 instructs the optical level of each channel to the OADM control circuit 175 of each OADM for adding PG.

In step S24 in FIG. 9, the OADM control circuit 175 regulates the optical level of each channel by VAT 136 and 169 according to the instruction from the system control circuit 56. The OADM control circuit 175 confirms the regulation result from the outputs of MO 167 and 170 and regulates VAT 169 so as to attain a target optical level. The OADM control circuit 175 outputs the end of regulation to the system control circuit 56.

The system control circuit 56 confirms the end of regulation and finishes also the pre-emphasis process.

As described above, the system control circuit 56 and each OADM control circuit 175 control the optical level of each channel and can conduct optimal pre-emphasis in the optical communication system having OADM 54 for dropping/adding/passing a predetermined channel between two terminal stations.

Next, the process for setting again pre-emphasis when re-setting becomes necessary as a result of the dropping/addition of the number of the channels of the WDM optical signal after setting of the optimal pre-emphasis will be explained with reference to FIGS. 11 and 12.

Figure 11:
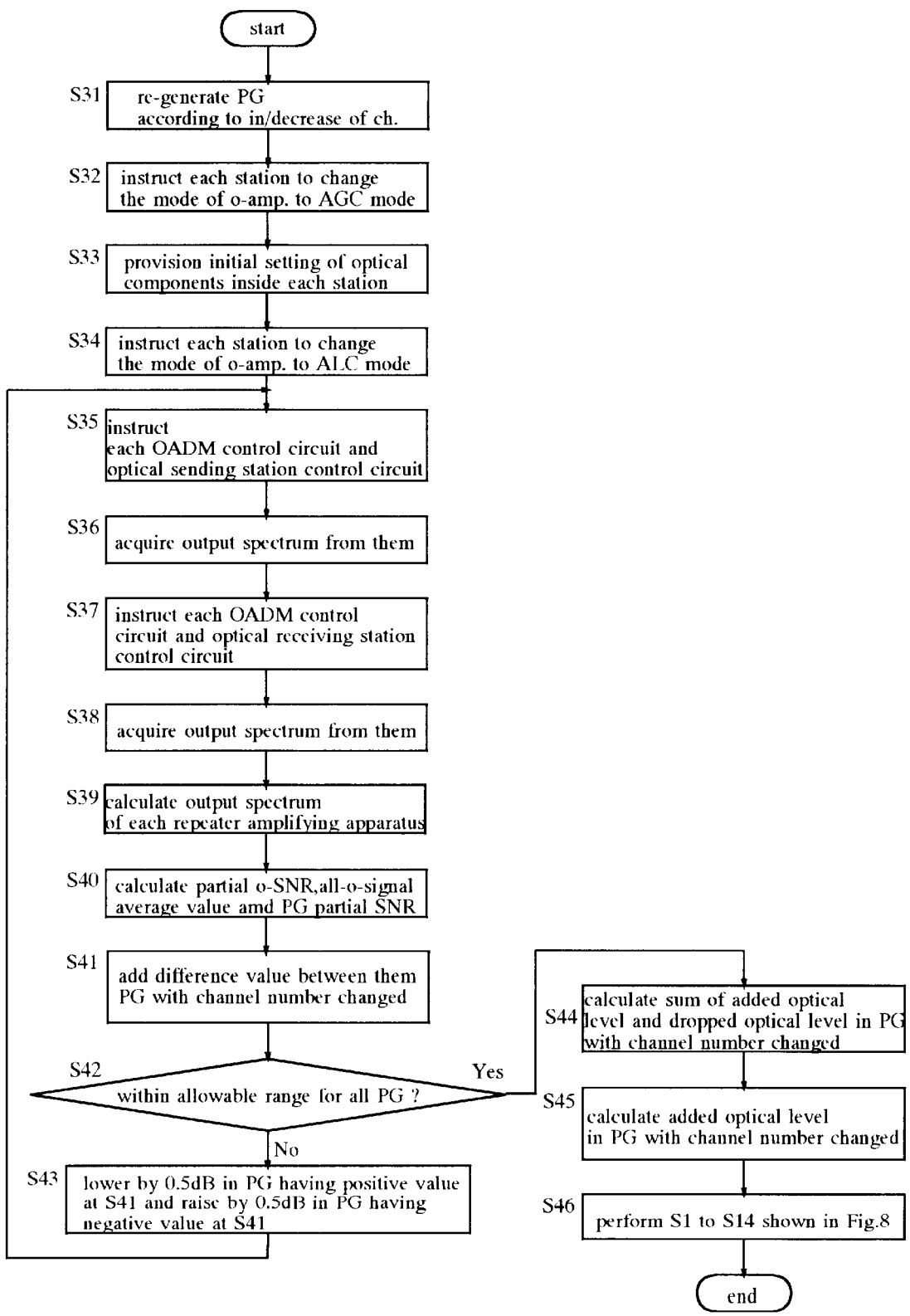
FIG. 11 is a flowchart of a system control circuit when pre-emphasis is re-set in accordance with the increase/decrease of the number of channels.

In step S31 in FIG. 11, the system control circuit 56 re-generates PG according to increase/decrease of the channels.

In step S32 in FIG. 11, the system control circuit 56 gives the instruction to change over the optical amplifier of each station to an AGC mode. The AGC mode is the mode that controls the gain of the optical amplifier.

Figure 12:
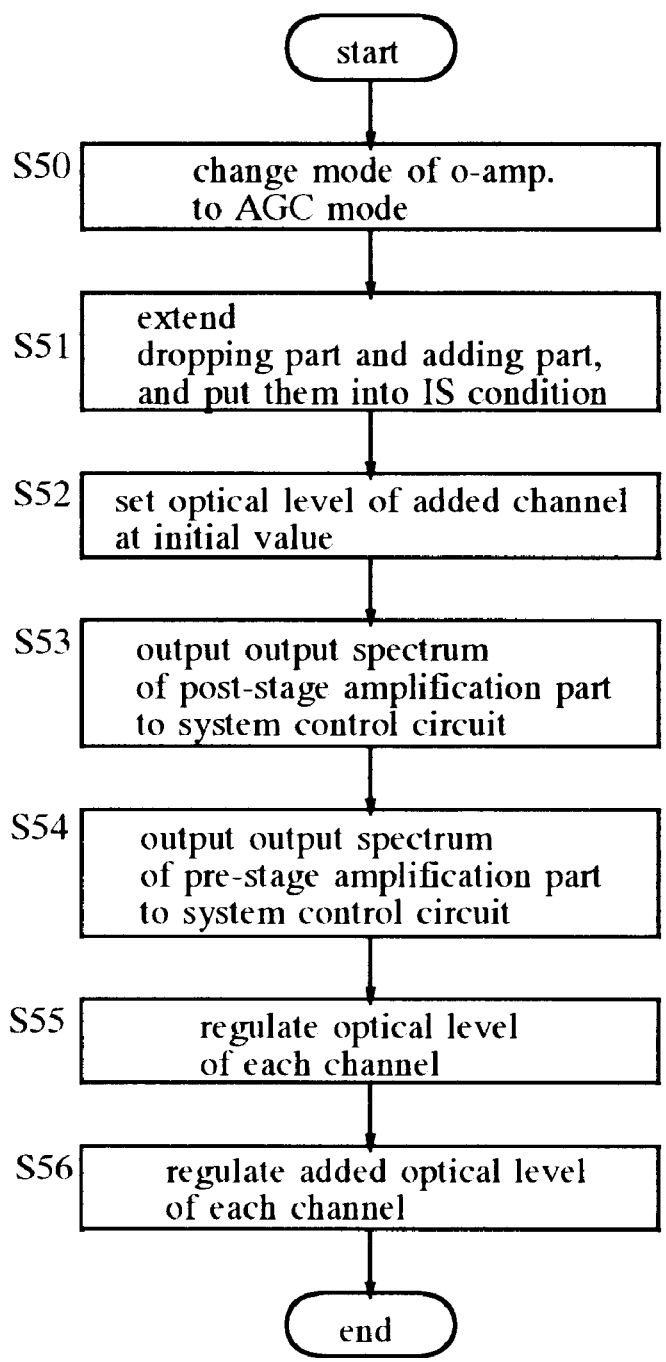
FIG. 12 is a flowchart of an OADM control circuit when pre-emphasis is re-set in accordance with the increase/decrease of the number of channels.

In step S50 in FIG. 12, the OADM control circuit 175 changes over the optical amplifier inside OADM to the AGC mode.

In step S51 in FIG. 12, the OADM control circuit 175 in OADM 64 for addition/dropping of the number of channels increases the drop part of FBG 141, the optical fiber 161 and DEM 162 for dropping and processing one channel. It also increases the adding part of the transmitter 165, the optical amplifier 166, the coupler 168, 171, MO 167 and 170, VAT 169 and FIL 172 for generating one channel. The OADM control circuit 175 brings the adding part into an IS condition.

The IS (in-service) condition signifies that the adding part is brought into a usable condition. When the adding part is added under the IS condition, the optical sender transmits light simultaneously with completion of the connection and exerts adverse influences on other optical signals. Since this is not desirable for the operation of the optical communication system, the adding part is added under an OOS (out-of-service) condition. Therefore, the adding part is brought into the IS condition after-adding is completed.

In step S52 in FIG. 12, the OADM control circuit 175 sets the added optical level of the added channel to the initial value. This initial value is set to the average value of the optical levels of the existing channels or the average value of the optical levels in the WDM optical signal outputted from OADM 64 lest the optical signals of the existing channels are affected adversely when the optical amplifier is returned from the AGC mode to the ALC mode.

In step S33 in FIG. 11, the system control circuit 56 provisions initial setting of various optical components inside the optical sending station 51, the repeating amplifying apparatus 53, OADM 54 and the optical sending station 55. Particularly because the numbers of channels are increased/decreased, setting of the optical amplifying apparatus is changed.

In step S34 in FIG. 11, the system control circuit 56 instructs the optical amplifying apparatus of each station to change over the ALC mode. The ALC mode is the mode that controls the output of the optical amplifying apparatus.

In step S35 in FIG. 11, the system control circuit 56 instructs each OADM control circuit 175 to output the output spectrum of the post-stage amplification part in each OADM 54. The system control circuit 56 also instructs the optical sending station control circuit 107 to output the output spectrum.

In step S53 in FIG. 12, the OADM control circuit 175 in the station of each OADM 54 receives the instruction from the system control circuit 56 and changes over SW 156 so that light from the coupler 155 can be inputted to SPA 157. Each OADM control circuit 175 outputs the output of SPA 157 (the output spectrum of the post-stage amplification part) to the system control circuit 56.

The optical sending station control circuit 107 outputs the output of SPA 106 (the output spectrum) to the system control circuit 56.

In step S36 in FIG. 11, the system control circuit 56 acquires the output spectrum of the post-amplification part in each OADM from each OADM control circuit 175. The system control circuit 56 acquires the output spectrum from the optical sending station control circuit 107.

In step S37 in FIG. 11, the system control circuit 56 instructs each OADM control circuit 175 to output the output spectrum of the pre-stage amplification part in each OADM. The system control circuit 56 instructs also the optical sending station control circuit 113 to output the input spectrum.

In step S54 in FIG. 12, the OADM control circuit 175 in the station of each OADM receives the instruction from the system control circuit 56 and changes over SW 156 so that light from the coupler 133 can be inputted to SPA 157. Each OADM control circuit 175 outputs the output of SPA 157 (the output spectrum of the pre-stage amplification part) to the system control circuit 56.

The optical receiving station control circuit 113 outputs the output of SPA (the input spectrum) to the system control circuit 56.

In step S38 in FIG. 11, the system control circuit 56 acquires the output spectrum of the pre-stage amplification part in each OADM from each OADM control circuit 175. The system control circuit 56 acquires the input spectrum from the optical receiving station control circuit 113.

Here, when the optical amplifier inside OADM 54 equalizes the gain, the output spectrum of the post-stage amplification part when gain equalization is not made and the output spectrum of the pre-stage amplification part are determined in consideration of the slope compensation quantity, and these values are used afresh as the output spectrum of the post-stage amplification part and the output spectrum of the pre-stage amplification part, respectively.

In step S39 in FIG. 11, the system control circuit 56 calculates the output spectrum of each repeater amplifying apparatus 53. Incidentally, this calculated can be done in the same way at the step S6 described already. Therefore, its explanation will be omitted.

In step S40 in FIG. 11, the system control circuit 56 calculates the partial optical SNR j, the all-optical-signal average value and PG partial optical SNR of each station. In the second embodiment, partial optical SNR j,k is defined by Pout j,k, and this Pout j,k is determined from each spectrum acquired in steps S36, S38 and S39.

In step S41 in FIG. 11, the system control circuit 56 calculates the difference between the all-optical-signal average value and partial optical SNR of path group in each station. The system control circuit 56 adds the difference for each station, that is calculated for all the stations to which PG is inputted, to PG the channel number of which increases or decreases.

In step S42 in FIG. 11, the system control circuit 56 judges whether or not the addition result of step S41 is within the allowable value for PG the channel number of which is dropped or added.

When the judgment result proves NO, the system control circuit 56 executes the step S43 in FIG. 11. When the judgment result proves YES, the system control circuit 56 executes the step S44 in FIG. 11.

In step S43 in FIG. 11, the system control circuit 56 instructs the OADM control circuit 175 of OADM 54, to which the dropping part such as DEM 162 and the adding part such as the sender 165 are added in S51 in FIG. 12, to lower by 0.5 dB PG having a positive value as the result of S41 and to raise by 0.5 dB PG having a negative value as the result of S41. The smaller the width of this regulation quantity, the higher becomes accuracy of pre-emphasis.

In step S55 in FIG. 12, the OADM control circuit 175 regulates the optical level of each channel by using VAT 169 according to this instruction of the system control circuit 56. The OADM control circuit 175 confirms the regulation result from the output of MO 167 and 170 and regulates VAT 169 so as to attain the target optical level. The OADM control circuit 175 outputs the end of regulation to the system control circuit 56.

Confirming the end of regulation, the system control circuit 56 returns the process to step S25 in FIG. 11 and executes steps S35 to S42.

In step S44 in FIG. 11, on the other hand, the system control circuit 56 calculates the sum of the added optical level and the dropped optical level for each channel in PG with the channel number increased or decreased, from the result of S40.

In step S45 in FIG. 11, the system control circuit 56 calculates the added optical level of each channel in PG, the channel number of which is added or dropped, so that the sum of each channel determined in S44 becomes substantially equal, and instructs the OADM control circuit 175 to add this PG.

In step S56 in FIG. 12, the OADM control circuit 175 regulates the added optical level by using VAT 136 and 169 according to the instruction from the system control circuit 56. The OADM control circuit 175 confirms the regulation result from the outputs of MO 167 and 170 and regulates VAT 136 and 169 so as to attain the target optical level. The OADM control circuit 175 outputs the end of regulation to the system control circuit 56.

In step S46 in FIG. 11, pre-emphasis is executed in accordance with the steps S1 to S14 shown in FIG. 8, and the system control circuit 56 finishes the process.

Pre-emphasis is set again when the number of channels of the WDM optical signal increases or decreases.

Incidentally, the second embodiment uses VAT 103, 136 and 169 to regulate the optical level of each channel for executing pre-emphasis. However, an optical amplifier may be used in place of VAT 103, 136 and 160 to regulate the optical level of each channel.

Next, still another embodiment will be explained.

Construction of Third Embodiment

The third embodiment relates to an embodiment of the optical communication system according to the present invention.

First, the overall construction of the optical communication system according to the third embodiment will be explained.

Figure 13A:
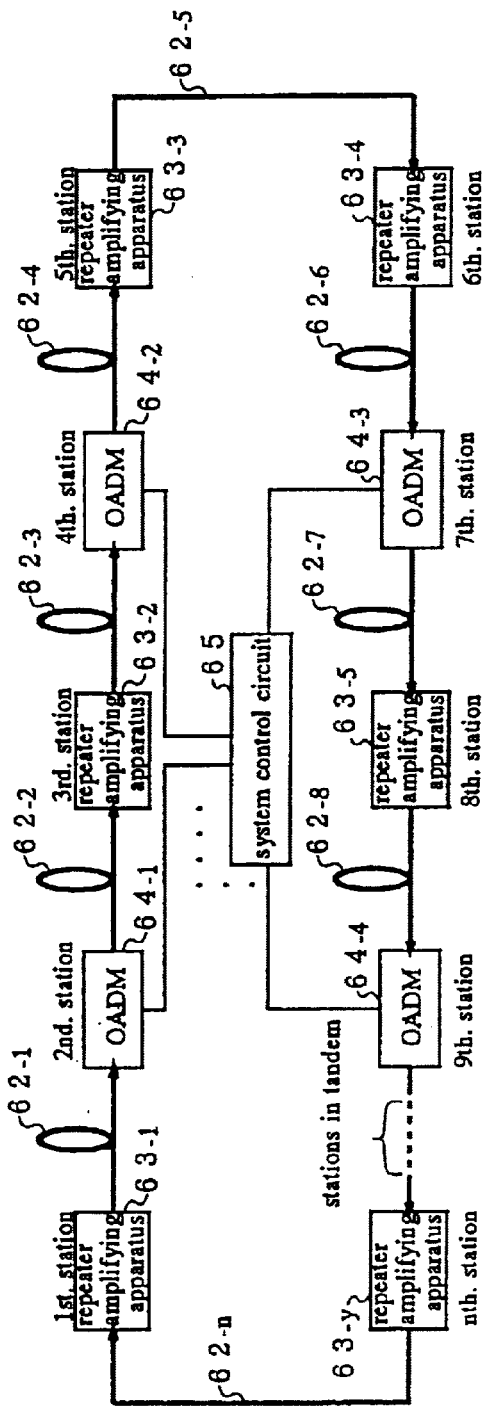
FIG. 13A shows a construction of an optical communication system according to the third embodiment.

Referring to FIG. 13A, the optical communication system of the third embodiment constitutes a ring-like network by using OADM 64 and optical transmission lines 62 for connecting these OADM 64. A repeater amplifying apparatus 63 for amplifying a WDM optical signal transmitted through the optical transmission line 62 is interposed between OADM 64 so as to compensate the transfer loss between OADM 64.

The optical add/drop multiplexer OADM 64 drops, adds and passes predetermined channels from the WDM optical signal transmitted through the optical transmission line 62. OADM 64 outputs the spectrum of the WDM optical signal inputted to OADM 64 and the spectrum of the WDM signal outputted from OADM 64 to the system control circuit 65, pre-emphasizes each channel to be added, according to the control signal of the system control circuit 65 and adds the channel to the optical transmission line 62.

Next, the construction of OADM used for the optical communication system of the third embodiment will be explained with reference to FIG. 14.

Figure 14:
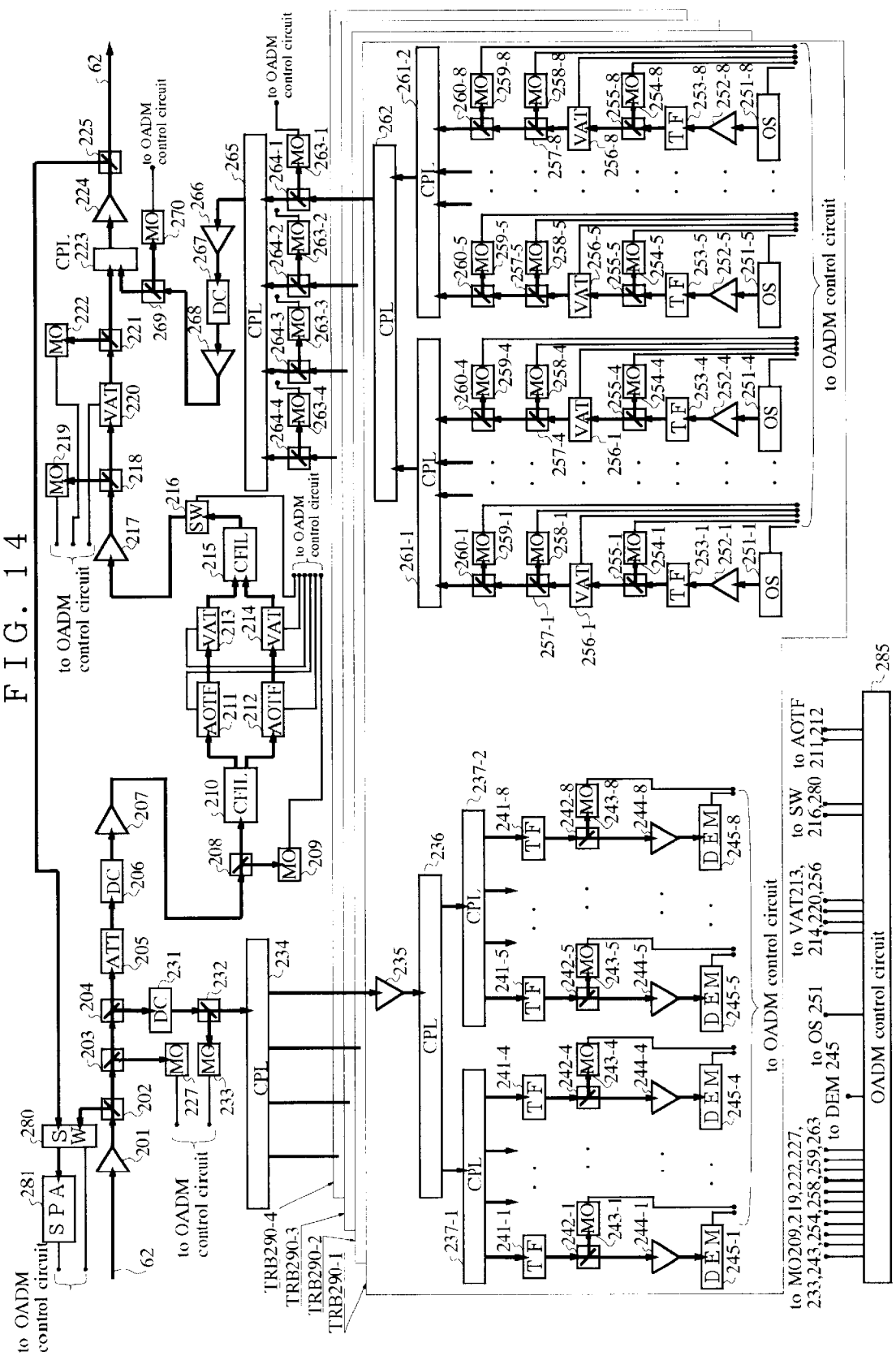
FIG. 14 shows a construction of OADM in the optical communication'system according to the third embodiment.

In FIG. 14, the WDM optical signal transmitted through the optical transmission line 62 is inputted to, and amplified by, an optical amplifier 201 of OADM 64. The optical amplifier 201 is a pre-amplifier for compensating the transmission loss that mainly occurs in the optical transmission line 62. The WDM optical signal so amplified is inputted to a coupler 202.

The WDM optical signal inputted to the coupler 202 is branched into two signals. One of the branched WDM optical signals is inputted to SW 280 and the other to a coupler 203.

The WDM optical signal inputted to the coupler 203 is branched into two signals. One of the branched WDM optical signals is inputted to MO 227 and the other to a coupler 204. The detection result of MO 227 is outputted to an OADM control circuit 285.

The OADM control circuit 285 can detect the optical level of the WDM optical signal inputted to OADM 64, signal disconnection, etc, from the output of this MO 227. It raises an alarm in the case of signal disconnection, whenever necessary. The signal disconnection occurs due to a failure between the optical amplifier 201 and the coupler 203, and so forth.

The WDM optical signal inputted to the coupler 204 is branched into two signals. One of the branched WDM optical signals is inputted to ATT 205 and the other to DC 231.

The WDM optical signal outputted to ATT 205 is processed by the later-appearing optical components and converted to a WDM optical signal passing through OADM 64. On the other hand, the WDM optical signal outputted to DC 231 is processed by the later-appearing optical components and the channel dropped in OADM 64 is taken out.

After the optical level is attenuated, the WDM optical signal inputted to ATT 205 is outputted to DC 206. The attenuation quantity of ATT 205 is regulated so that the nonlinear optical phenomena occurring in DC 206 can be prevented.

A dispersion compensator DC 206 compensates the chromatic dispersion occurring mainly in the optical transmission line 62 for the channel passing through OADM 64. The WDM optical signal after compensating the chromatic dispersion is outputted to an optical amplifier 207. The optical amplifier 207 compensates the transmission loss occurring in the couplers 202, 203 and 204, ATT 205 and DC 206.

The WDM optical signal amplified by the optical amplifier 207 is inputted to the coupler 208 and is branched into two signals. One of the branched WDM optical signals is inputted to a cyclic filter (CFIL) 210 and the other to MO 209. The detection result of MO 209 is outputted to the OADM control circuit 285.

The OADM control circuit 285 detects the presence/absence of the WDM optical signal inputted to CFIL 210 from the output of MO 209. Consequently, the OADM control circuit 285 can detect the trouble of ATT 205, DC 206 and the optical amplifier 207 and disconnection of each optical connector when it is connected by a connector, and raises an alarm, whenever necessary.

The WDM optical signal inputted to CFIL 210 is divided by CFIL 210 into even-numbered channels and odd-numbered channels, and they are inputted to acousto-optical tuner filers (AOTF) 211 and 212, respectively.

AOTF 211 and 212 are acousto-optical filters that separate and select input light by a diffraction effect by utilizing the change of a refractive index induced by the acousto-optical effect. The ultrasonic wave that generates the acousto-optical effect utilizes a surface acoustic wave. The surface acoustic wave is generated when a voltage of an RF frequency is applied to an electrode that is formed on a substrate exhibiting the piezoelectric effect. Therefore, when the RF frequency is controlled, the channels that are cut off by OATF 211 and 212 can be changed.

The channels that OATF 211 and 212 cut off are controlled by the control signal of the OADM control circuit 285, and the channels dropped by OADM 64 are selected as the channels to be cut off.

After the channels are separated by CFIL into the even-numbered channels and to the odd-numbered channels, AOTF 211 and 212 cut off the channels to be cut off for the following reason. When the channels are separated into the even-numbered channels and the odd-numbered channels, the gap becomes twice the channel gap of the WDM optical signals. Therefore, it becomes easier and more reliable to cut off the channels to be cut off than when they are cut off by using one AOTF.

The WDM optical signal outputted from AOTF 211 after the predetermined channels are cut of f is inputted to VAT 213. The WDM optical signal outputted from AOTF 212 after the predetermined channels are cut off is inputted to VAT 214.

The attenuation quantity of each VAT 213 and 214 is controlled by the control signal from the OADM control circuit 285. VAT 213 and 214 regulate the optical level generated due to the difference of the number of channels cut off by each AOTF 211 and 212 so that the optical levels of the WDM optical signals outputted from AOTF 211 and 212 become substantially equal to each other. VAT 213 and 214 then output these optical signals to DFIL 215.

The even-numbered channel and the odd-numbered channel of the WDM optical signal inputted from each VAT 213 and 214 to CFIL 215 are wavelength-multiplexed in CFIL 215. The WDM optical signal is then inputted to SW 216.

A switch SW 216 is an optical switch. The OADM control circuit 285 controls cut-off and transmission of this switch SW 216. When brought into the cut-off condition, SW 216 can prevent the leak to the optical transmission line 62 when each optical component inside OADM 64 is set or when any trouble occurs in OADM 64. Therefore, adverse influences such as crosstalk does not occur in such cases in the WDM optical signal transmitted between other OADM 64.

The acousto-optic tunable filter AOTF, in particular, needs generally correction of the relationship between the RF frequency and the cut-off wavelength in a suitable interval due to temperature dependence of the cut-off wavelength and the change with time. The switch SW 216 is effective in such a case.

The WDM optical signal from SW 216 is inputted to an optical amplifier 217. The optical amplifier 217 is a pre-amplifier for compensating the transmission loss that occurs in each optical component interposed between the optical amplifier 207 and the optical amplifier 217.

The WDM optical signal amplified by the optical amplifier 217 is inputted to a coupler 218 and is branched into two signals. One of the branched WDM optical signals is inputted to VAT 220 and the other to MO 219. The WDM optical signal attenuated by VAT 220 is inputted to VAT 220 and is branched into two signals. One of the branched WDM signals is inputted to the WDM coupler 223 and the other to MO 222. The detection result of MO 219 and 222 is outputted to the OADM control circuit 285.

The OADM control circuit 285 regulates the attenuation quantity of VAT 220 on the basis of the detection results of MO 219 and MO 222, and regulates the optical level of the WDM optical signal. The OADM control circuit 285 regulates the attenuation quantity so that the average optical level of the WDM optical signals transmitted through OADM 64 is substantially equal to the average optical level of the WDM optical signals added. The OADM control circuit 285 judges the average optical level of the WDM optical signal added from the output of the later-appearing MO 270.

The coupler 223 wavelength-multiplexes the WDM optical signal outputted from the coupler 221 and passing through OADM 64 with the WDM optical signal generated by the later-appearing construction and added in OADM 64. The WDM optical signal so wavelength-multiplexed is outputted to an optical amplifier 224. The optical amplifier 224 is a post-amplifier. The WDM optical signal amplified is outputted to a coupler 225.

The WDM optical signal inputted to the coupler 225 is branched into two signals. One of the branched WDM optical signals is outputted to the optical transmission line 62 so that it can be transmitted to the station of the next stage. The other WDM optical signal is outputted to SW 280.

A switch SW 280 is a 2×1 optical switch, and outputs either one of the WDM optical signal from the coupler 202 and the WDM optical signal from the coupler 225 to SPA 281 in accordance with the control signal from the OADM control circuit 285.

SPA 281 measures the spectrum of the WDM optical signal inputted to OADM 64 and amplified by the optical amplifier 201 or the spectrum of the WDM optical signal outputted from OADM 64 to the optical transmission line 62 depending on the selection of SW 280, and outputs the measurement result to the OADM control circuit 285.

On the other hand, the WDM optical signal branched by the coupler 204 is inputted to DC 231. Reception/processing of the channels dropped in OADM 64 is performed in the following way.

The dispersion compensator DC 231 compensates wavelength dispersion occurring mainly in the optical transmission line 62 for the channels dropped in OADM 64. The WDM optical signal with the wavelength dispersion compensated is outputted to a coupler 232.

The WDM optical signal inputted to the coupler 232 is branched into two signals. One of the branched WDM optical signals is inputted to a coupler 234 and the other to MO 233.

The detection result of MO 233 is outputted to the OADM control circuit 285. The OADM control circuit 285 can detect the signal detection, etc, of the WDM optical signal dropped in OADM 64 by means of the output from MO 233, and raises an alarm, whenever necessary.

The WDM signal inputted to the coupler 234 is branched into four signals and then inputted to tributaries (TRB) 290-1 to 290-4, respectively. One tributary TRB 290 can receive the optical signals for eight channels and can generate the optical signals for eight channels. TRB 290-1 receives and generates the optical signals for the channels ch.1 to ch.8. TRB 290-2 receives and generates the optical signals for the channels ch.9 to ch.16. TRB 290-3 receives and generates the optical signals for the channels ch.17 to ch.24. TRB290-4 receives and generates the optical signals for the channels ch.25 to ch.32.

Since TRB 290-1 to 290-4 have mutually the same construction, explanation will be given on 290-1 but omitted on TRB 290-2 to 290-4.

One of the branched WDM optical signals by the coupler 234 is inputted to the optical amplifier 235 of TRB 290-1. The optical amplifier 235 compensates the loss occurring in each optical component between the optical amplifier 201 and the optical amplifier 235. The WDM signal amplified by the optical amplifier 235 is inputted to a coupler 236 and branched into two signals. The branched WDM optical signals are inputted to couplers 237-1 and 237-2, respectively.

The WDM optical signal inputted to the coupler 137-1 is further branched into four signals and then inputted to TF 241-1 to 241-4, respectively. Symbol TF stands for a wavelength variable optical filter. TF 241-1 is a band-pass filter that passes light of a predetermined wavelength band. The center wavelength of the transmission wavelength band is set to a wavelength corresponding to the wavelength of the channel ch.1. Therefore, TF 241-1 passes only the optical signal of ch.1 from among the WDM optical signals of 32 waves.

The optical signal of ch.1 outputted from TF 241-1 is inputted to a coupler 242-1. The optical signal of ch.1 inputted to the coupler 242-1 is branched into two signals. One of the branched optical signals of ch.1 is inputted to an optical amplifier 244-1 and the other to MO 243-1.

MO 243-1 detects the optical level of ch.1. The detection result is outputted to the OADM control circuit 285. The OADM control circuit 285 confirms the presence/absence of the optical signal of ch.1 from the output of MO 243-1.

The optical amplifier 244-1 is a pre-amplifier and outputs the optical signal of ch.1 outputted from the coupler 242-1 after it is amplified.

DEM 245-1 demodulates the optical signal of ch.1 outputted from the optical amplifier 244-1 and takes out information from the optical signal of ch.1. DEM 245-1 can use a light reception device such as a photo-diode that converts an optical signal to an electric signal.

The same construction as the construction comprising TF 241-1, thecoupler242-1, MO 243-1, the optical amplifier 244-1 and DEM 245-1 is provided in each branched WDM optical signal by the couplers 237-1 and 237-2. The center wavelength of the transmission wavelength band of each TF 241-2 to 241-8 is set to a wavelength corresponding to the wavelength of the channels ch.2 to ch.8.

In this way, the optical signals of the channels ch.1 to ch.8 are received and processed inside TRB 290-1.

On the other hand, the optical signals of the channels ch.1 to ch.8 added in OADM 64 are generated in the following way.

A sender 251-1 inside TRB 290-1 comprises LD and MOD and generates the optical signal of the wavelength of the channel ch.1. The optical signal of ch.1 thus generated is outputted to an optical amplifier 252-1.

The optical amplifier 252-1 is a post-amplifier. The optical signal of ch.1 amplified is inputted to TF 253-1. The center wavelength of the transmission wavelength band of TF 253-1 is set to a wavelength corresponding to the wavelength of ch.1. Therefore, TF 253-1 can transmit only the optical signal of ch.1 and can remove ASE occurring in the optical amplifier 252-1.

The optical signal of ch.1 outputted from TF 253-1 is outputted to a coupler 255-1, and the optical signal of ch.1 is branched into two signals. One of the branched optical signals of ch.1 is outputted to MO 254-1 and the other to VAT 256-1. The detection result of MO 254-1 is outputted to the OADM control circuit 285. VAT 256-1 attenuates the optical level of the optical signal outputted from the coupler 255-1 and then outputs it to a coupler 257-1. The attenuation quantity is controlled by the control signal from the OADM control circuit 285.

The coupler 257-1 branches the optical signal outputted from VAT 256-1. One of the branched optical signals is outputted to MO 258-1 and the other to a coupler 260-1. The detection result of MO 258-1 is outputted to the OADM control circuit 285. A coupler 260-1 branches the optical signal outputted from VAT 256-1 into two signals. One of the optical branched signals is outputted to a coupler 260-1 and the other to MO 259-1. The detection result of MO 259-1 is outputted to the OADM control circuit 285. The OADM control circuit 285 confirms the presence/absence of the optical signal of ch.1 from the output of MO 259-1.

The OADM control circuit 285 regulates the attenuation quantity of VAT 256-1 on the basis of the detection result of MO 254-1 and MO 258-1 and regulates the optical level of the optical signal of ch.1 to a desired optical level. The optical level of the optical signal added in OADM 64 can be regulated as the attenuation quantity is regulated in this way, and optimal pre-emphasis can be applied.

The construction comprising the sender 251-1, the optical amplifier 252-1, the coupler 255-1, MO 254-1, VAT 256-1, the coupler 257-1, MO 258-1, the coupler 260-1 and MO 259-1 is provided in each of the channels ch.1 to ch.8. The center wavelength of the transmission wavelength band of each TF 253-2 to 253-8 is set to a wavelength corresponding to the wavelength of the channels ch.2 to ch.8.

The channels ch.1 to ch.4 outputted from each coupler 260-1 to 26-4 is inputted to a coupler 251-1 and wavelength-multiplexed. The WDM optical signal of ch.1 to ch.4 so wavelength-multiplexed is outputted to a coupler 262. The channels ch.5 to ch.8 outputted from each coupler 260-5 to 260-8 are inputted to a coupler 261-2 and wavelength-multiplexed. The WDM optical signal of ch.5 to ch.8 so wavelength-multiplexed is outputted to the coupler 262.

The coupler 262 wavelength-multiplexes the WDM optical signal outputted from the coupler 261-1 with the WDM optical signal outputted from the coupler 261-2 and generates the WDM optical signal of ch.1 to ch.8.

In this way, the optical signals of ch.1 to ch.8 are generated inside TRB 290-1.

Which channel is to be dropped, received and processed by OADM 64 from among the WDM optical signals of 32 waves and which channel is to be generated and added are decided when the OADM control circuit 285 controls DEM 245-1 to 245-32, the senders 251-1 to 251-32, TF 241-1 to 241-32 and TF 253-1 to 253-32.

The WDM optical signal outputted from each TRB 290-1 to 290-4 is inputted to a coupler 264-1 to 264-4. Each coupler 264-1 branches the WDM signal into two. One of the branched WDM optical signals is outputted to a coupler 265 and the other to the corresponding MO 263-1 to 263-4. The detection result of each M0263-1 to 263-4 is outputted to the OADM control circuit 285. The OADM control circuit 285 confirms the presence/absence of the WDM optical signal of the corresponding TRB 290-1 to 290-4 from the output of each MO 263-1 to 263-4.

The coupler 265 wavelength-multiplexes each WDM optical signal from TRB 290-1 to 290-4 inputted through the corresponding coupler 264-1 to 264-4 and outputs the signal to an optical amplifier 266.

The optical amplifier 266 compensates the transmission loss occurring in each component inside TRB 290. The WDM signal amplified by the optical amplifier 266 is outputted to DC 267.

DC 267 compensates the chromatic dispersion occurring mainly in the optical transmission line 52 for the channel added in OADM 64 and outputs the WDM optical signal to a coupler 269. The coupler 269 branches the WDM optical signal into two WDM optical signals. One of the branched WDM optical signals is outputted to the WDM coupler 223 and the other to MO 270.

The detection result of MO 270 is outputted to the OADM control circuit 285. The OADM control circuit 285 confirms the presence/absence of the optical signals of the channels to be added in OADM 64 from the output of MO 270.

Here, each optical amplifier 201, 207, 217, 224, 244 and 252 generates population inversion by supplying energy from outside to an amplification medium, inputs light to be amplified under this state and amplifies light at a predetermined gain by stimulated emission. The optical amplifier can utilize a semiconductor laser amplifier or an optical fiber amplifier, for example.

Each coupler 202, 203, 204, 208, 218, 221, 223, 232, 242, 255, 257, 260, 261, 262, 264, 265, 269 is an optical coupler for branching input light into two. The coupler can utilize a micro-optical device type optical coupler represented by a half mirror, an optical fiber type optical coupler such as a molten fiber, and a wave-guide type optical coupler.

Each DC 206, 231, 267 can utilize a dispersion compensation fiber having a dispersion value of an opposite sign so as to compensate dispersion occurring in the WDM optical signal.

As described above, OADM 64 applied to the optical communication system according to the third embodiment has the function of measuring the optical level of each channel of the WDM signal inputted to OADM, the function of measuring the optical level of each channel of the WDM signal outputted from OADM and the function of regulating the optical level of the channel to be added besides the functions of dropping/adding/passing the predetermined channel from the WDM optical signal.

Incidentally, it is also possible to employ the construction wherein the coupler 202 is connected immediately ahead of the optical amplifier 201 to measure the spectrum of the WDM optical signal inputted to the optical amplifier 201.

Function and Effect of Third Embodiment

Next, pre-emphasis in the optical communication system according to the third embodiment will be explained.

To activate the optical communication system according to the third embodiment shown in FIGS. 13 and 14, each apparatus is serially activated either clockwise or counterclockwise from an OADM (optical add/drop multiplexer) 64.

Arrival of the signal, ASE correction, limiting of the input optical level of DC, or the like can be confirmed for each apparatus.

The optical level of each channel added in OADM 64 is set to a substantially equal level and to an average optical level of the channel passing through OADM 64.

In OADM 64, whether or not the average optical level inputted to the optical amplifier 217 exceeds a predetermined value is confirmed from all optical levels inputted to the optical amplifier 224, the ASE correction quantity of the optical amplifiers 201 and 207 and the number of channels.

After this initial setting is made for each apparatus, the optical communication system is pre-emphasized in the following way. This pre-emphasis will be explained with reference to FIGS. 15 and 16.

Figure 15:
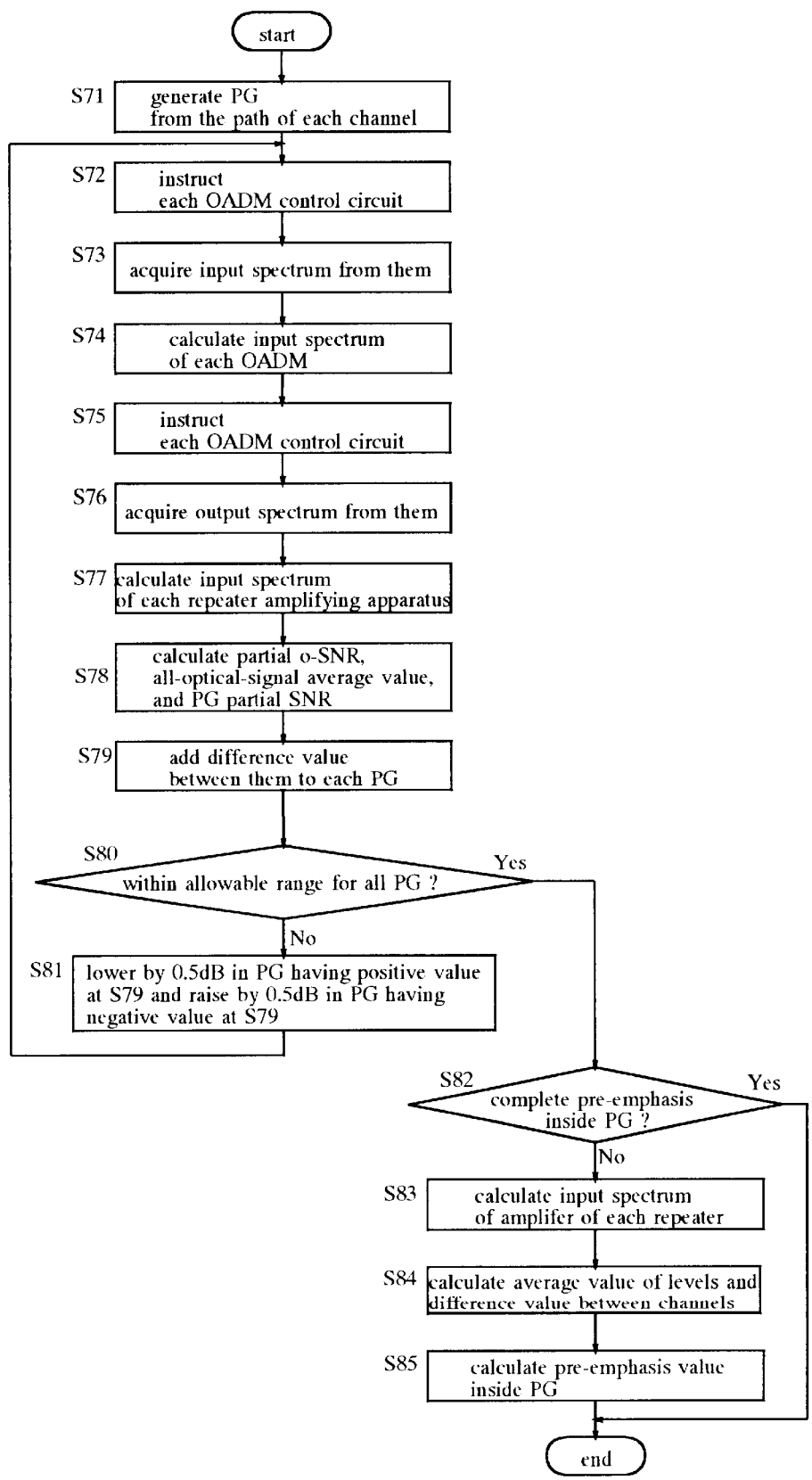
FIG. 15 is a flowchart of a system control circuit in the optical communication system according to the third embodiment.

In step S71 in FIG. 15, the system control circuit 65 generates PG from the path of each channel.

In this embodiment, the channels ch.1 to ch.16 that are added from the station 2 of OADM 64-1 and dropped in the station 7 of OADM 64-3 are collected to be PG1, for example. The channels ch.1 to ch.8 that are added from the station 7 of OADM64-3 and dropped from the station 9 of OADM 64-4 are collected to be PG2. The channels ch.17 to ch.32 that are added from the station 4 of OADM 64-2 and dropped from the station 9 of OADM 64-4 are collected to be PG3. The channels ch.17 to ch.24 added from the station 9 of OADM 64-4 and dropped from the station 2 of OADM 64-1 are collected to be PG4. The channels ch.9 to ch.16 added from the station 7 of OADM 64-3 and dropped from the station 2 of OADM 64-1 are collected to be PG5.

In step S72 in FIG. 15, the system control circuit 65 instructs each OADM control circuit 285 to output the output spectrum of the optical amplifier 201 in each OADM 64.

Figure 16:
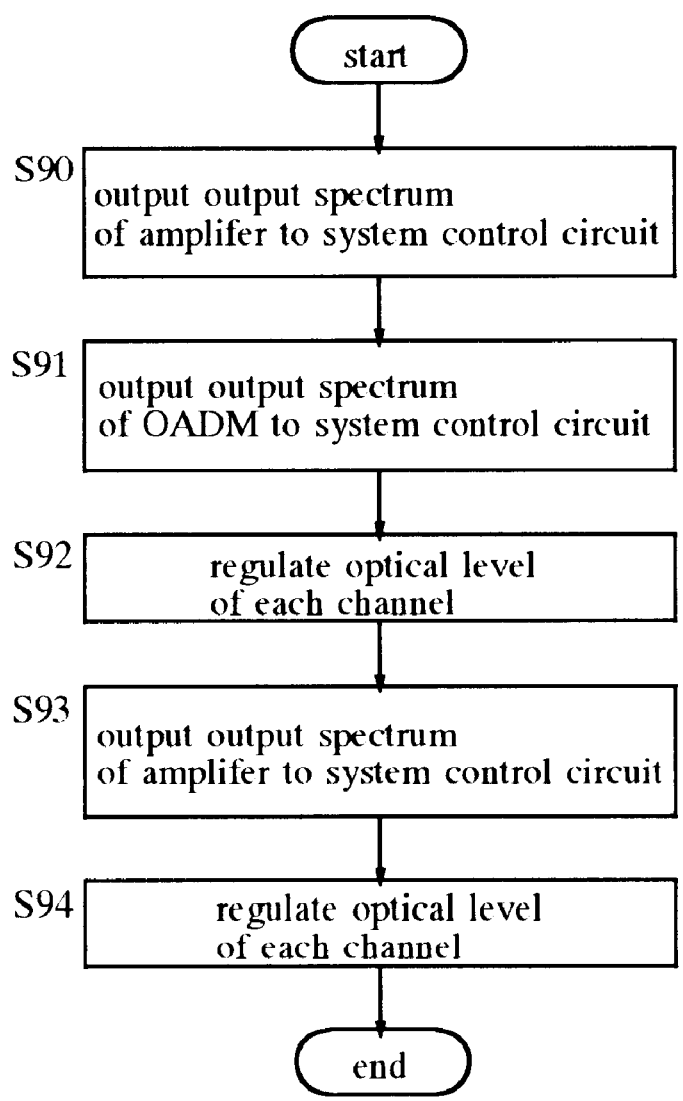
FIG. 16 is a flowchart of an OADM control circuit in the optical communication system according to the third embodiment.

In step S90 in FIG. 16, the OADM control circuit 285 in the station of each OADM 64 receives the instruction from the system control circuit 65 and changes over SW 280 so that output light from the coupler 202 can be inputted to SPA 281. Each OADM control circuit 285 outputs the output of SPA 281 (the output spectrum of the optical amplifier 201) to the system control circuit 65.

In step S73 in FIG. 15, the system control circuit 65 acquires the output spectrum of the optical amplifier 201 in each OADM 64 from each OADM control circuit 285.

In step S74 in FIG. 15, the system control circuit 65 calculates the input spectrum of each OADM 64.

The output spectrum of the optical amplifier 201 acquired in step S73 is the spectrum obtained by superposing ASE of the optical amplifier with the slope compensation quantity for equalizing the gain wavelength characteristics. Therefore, the input spectrum of each OADM 64 can be calculated by subtracting these SEA and slope compensation quantity from the output spectrum of the optical amplifier 201.

In step S75 in FIG. 15, the system control circuit 65 instructs each OADM control circuit 285 to output the output spectrum of each OADM 64.

In step S91 in FIG. 16, the OADM control circuit 285 in the station of each OADM receives the instruction of the system control circuit 65 and changes over SW 280 so that output light of the coupler 225 can be inputted to SPA 281. Each OADM control circuit 285 outputs the output of SPA 280 (the output spectrum of OADM 64) to the system control circuit 65.

In step S76 in FIG. 15, the system control circuit 65 acquires the output spectrum of each OADM from each OADM control circuit 285.

When the optical amplifier inside OADM 64 executes gain equalization for equalizing the gain wavelength dependence of the optical amplifier resulting from ASE, the slope compensation quantity for compensating gain equalization is subtracted from the output spectrum of the optical amplifier 201 in step S73, and the output spectrum of the optical amplifier 201 when gain equalization is not made is calculated, and is used as a new output spectrum of the optical amplifier 201.

In step S77 in FIG. 15, the system control circuit 65 calculates the input spectrum of each repeater amplifying apparatus 63. The input spectrum of each delay amplifying apparatus 63 is calculated in the same way as in step S6 of the second embodiment shown in FIG. 8. Therefore, the explanation will be omitted.

The system control circuit 65 acquires in this way the input spectrum of the WDM optical signal in each station.

In step S78 in FIG. 15, the system control circuit 65 calculates partial optical SNR j, the average value of all optical signals and partial SNR of path group. This embodiment uses expression (3) as partial optical SNR j,k. However, optical SNR j,k can be calculated from the following expression (9) by using the values of S74, S76 and S77.

$$\text{partial } o\text{-}SNR_{j,k} = Pin_{j,k} - NF_{j,k} + 57.9 \text{ (dB)} \tag{9}$$

Expression (9) is the one obtained by converting expression (3) to a decibel unit. Symbol hvΔf is a constant, and 10log(hvΔf)=57.9.

In step S79 in FIG. 15, the system control circuit 65 calculates the difference between the average value of all optical signals and partial SNR of path group in each station. The system control circuit 65 adds the difference for each station that is determined for all the stations to which PG is inputted.

In step S80 in FIG. 15, the system control circuit 65 judges whether or not the addition result of S8 is within the range of an allowable value. When it is out of the allowable range, the system control circuit 65 executes the step S81 in FIG. 15. When the addition result is within the allowable range, the system control circuit 65 executes the step S82 in FIG. 15.

In step S81 in FIG. 15, the system control circuit 65 instructs the OADM control circuit 285 of OADM which adds PG to lower by 0.5 dB the value for PG having a positive value result in S79 and to raise by 0.5 dB the value for PG having a negative value result in S79.

In step S92 in FIG. 16, the OADM control circuit 285 regulates the optical level of each channel by using VAT 220 and 256 according to the instruction of the system control circuit 65. The OADM control circuit 285 confirms the regulation result from the outputs of MO 254 and 258 and regulates VAT 256 so as to attain the target optical level. The OADM control circuit 285 outputs the end of regulation to the system control circuit 65.

Confirming the end of regulation, the system control circuit 65 returns the process to S72 in FIG. 15 and executes the steps S72 to S80.

In step S82 in FIG. 15, on the other hand, the system control circuit 65 judges whether or not pre-emphasis is finished inside PG. When pre-emphasis is finished, the system control circuit 65 executes the step S83 in FIG. 15 and when not, the system control circuit 65 finishes the pre-emphasis process.

In step S83 in FIG. 15, the system control circuit 65 instructs each OADM control circuit 285 to output the output spectrum of the optical amplifier 201 of each OADM 64.

In step S93 in FIG. 16, the OADM control circuit 285 of each OADM 64 receives the instruction of the system control circuit 65 and changes over SW 280 so that output light of the coupler 202 can be inputted to SPA 281. Each OADM control circuit 285 outputs the output of SPA 281 (the output spectrum of the optical amplifier 201) to the system control circuit 65.

In step S94 in FIG. 15, the system control circuit 65 subtracts ASE of the optical amplifier 201 and the slope compensation quantity from the result of S73 and calculates the input spectrum of each OADM 64. The system control circuit 65 calculates the average value of partial optical SNR j of only the channel to be dropped for each PG from this input spectrum by using expression (9). The system control circuit 65 calculates the partial optical SNR j and its deviation from the average value for each channel in each PG.

In step S85 in FIG. 15, the system control circuit 65 adds the amount obtained by inverting the sign of the deviation of the pre-emphasis quantity of each channel inside PG to each channel. The system control circuit 65 instructs the OADM control circuit 285 in each OADM 64 to add partial optical SNR j of each channel OADM 64 for adding PG.

In step S94 in FIG. 16, the OADM control circuit 285 calculates Pinj of each channel from partial optical SNR j according to the instruction of the system control circuit 65 and regulates the optical level of each channel by using VAT 256. The OADM control circuit 285 confirms the regulation result from the outputs of MO 254 and 258 and regulates VAT 256 so as to attain the target optical level. The OADM control circuit 285 outputs the end of regulation to the system control circuit 65.

Confirming the end of regulation, the system control circuit 65 finishes the pre-emphasis process.

The system control circuit 56 and each OADM control circuit 285 control in this way the optical level of each channel and can thus apply optimal pre-emphasis in the ring network equipped with OADM 64 for dropping/adding/passing predetermined channels.

Still another embodiment will be explained.

Construction of Fourth Embodiment

The fourth embodiment relates to an embodiment of an optical SNR measuring apparatus according to the present invention.

Figure 17A:
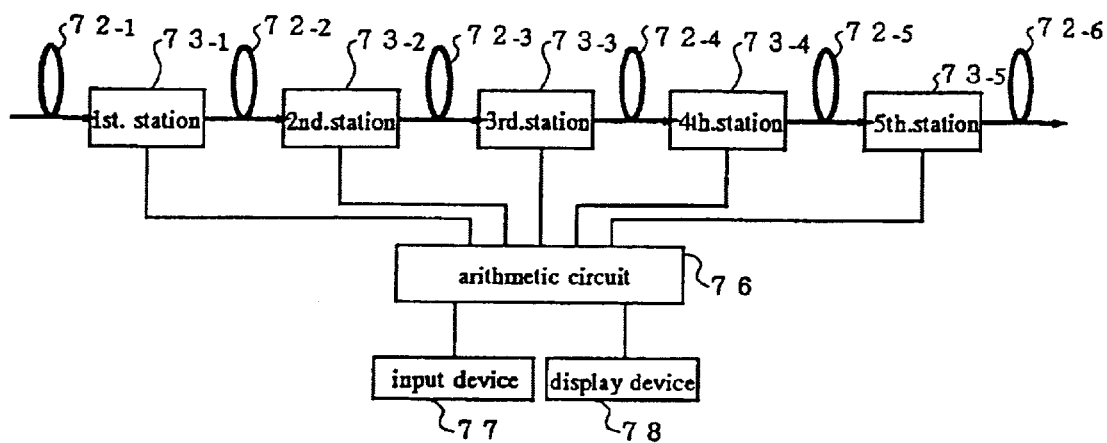
FIG. 17A shows an overall construction of an optical SNR measuring apparatus in the fourth embodiment.

In FIG. 17A, a WDM optical signal is transmitted through an optical transmission line 72. A plurality of stations 73 for amplifying light is inserted into the optical transmission line 72 to compensate the transmission loss. The station 73 transmits a signal from a monitor control circuit 316 to an arithmetic circuit 76 as will be described later. An input device 77 and a display device 78 are connected to the arithmetic circuit 76. The input device 77 is a means such as a switch or a keyboard, and input the command of the start of measurement, or the like. The display device 78 is a means such as a CRT or a liquid crystal display, and displays the measurement result. FIG. 17A shows the case where optical SNR is measured in the zone from the first station 73-1 to the fifth station 73-5.

Figure 17B:
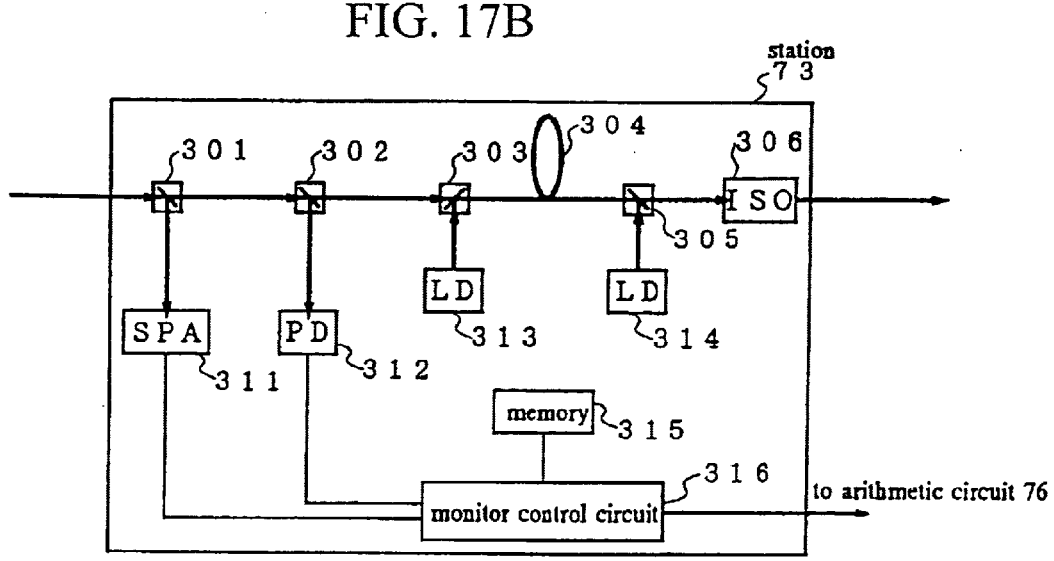
FIG. 17B shows a construction of a station in the optical SNR measuring apparatus according to the fourth embodiment.

In FIG. 17B, the WDM optical signal inputted to the station 73 is optically amplified through couplers 301, 302, 303, a rear earth metal-doped optical fiber 304, a coupler 305, and ISO 306, and is outputted from the station 73.

The coupler 301 branches a part of the input WDM optical signal to SPA 311. SPA 311 outputs a signal corresponding to the spectrum of the WDM optical signal received to the monitor control circuit 316.

LED 313 and 314 emit pump light for exciting the rare earth element-doped optical fiber. The coupler 303 combines pump light of LD 313 with the WDM optical signal outputted from the coupler 302, and the signal is supplied to the rare earth element-doped optical fiber 304. Pump light of LD 314 is supplied to the rare earth element-doped optical fiber 304 through the coupler 305. In this way, LD 313 plays the role of forward pumping of the rare earth element-doped optical fiber while LD 313 does the role of backward pumping.

When one LD can alone excites the rare earth element-doped optical fiber to such an extent as to be capable of sufficiently amplifying the WDM optical signal to be amplified, only one of LD 313 and 314 may be used.

The rare earth element to be added to the optical fiber is selected in accordance with the wavelength of the WDM optical signal to be amplified. The oscillation wavelength of LD is set to the wavelength of light capable of exciting the rare earth element so selected. When the WDM optical signal is in a 1,550 nm band, for example, the erubium element (Er) is selected as the rare earth element and when the WDM optical signal is in a 1,450 nm band, thulium element (Tm) is selected as the rare earth element. Incidentally, both erbium and thulium are lanthanoid rare earth elements, and the elements belonging to lanthanoid have mutually analogous properties.

When the rare earth element-doped optical fiber 304 absorbs pump light, the rare earth element inside the fiber is excited, forming population inversion. When the WDM optical signal is inputted under the state where population inversion is formed, stimulated emission takes place while guided by the WDM optical signal with the result of amplification of the WDM optical signal.

ISO 306 plays the role of preventing infinite propagation of reflected light occurring at the junction of optical components inside the station 73. Particularly when reflected light returns to LD 313 and 314, the oscillation mode of LD 313 and 314 changes and the noise occurs as LD 313 and 314 are induced by reflected light having various phases and amplitudes. Therefore, ISO 306 is provided to prevent such adverse influences.

On the other hand, the monitor control circuit 316 sends the outputs of SPA 311 and PD and the noise index stored in a memory 315 to the arithmetic circuit 76. The noise index is the noise index of the optical fiber amplifier in the station 73 comprising LD 313 and 314, the couplers 303 and 304 and the rare earth element-doped optical fiber.

Function and Effects of Fourth Embodiment

Optical SNR measurement in the fourth embodiment will be explained.

Figure 18:
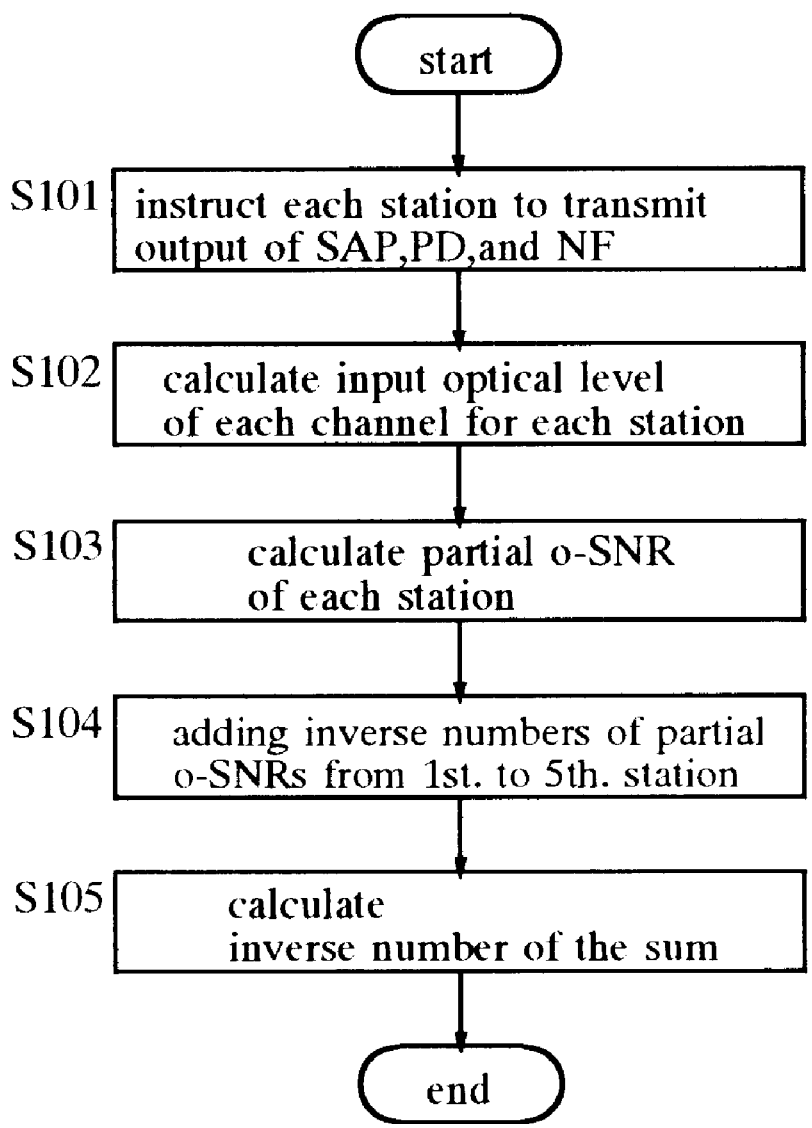
FIG. 18 is a flowchart of an arithmetic circuit in the fourth embodiment.

In FIG. 18, the arithmetic circuit 76 is instructed to start measurement by the input device 77. The arithmetic circuit 76 instructs each station 73 to transmit the output of SPA 311, the output of PD 312 and the noise index (S101).

The monitor control circuit 316 of each station 73 transmits the signal storing the information content described above to the arithmetic circuit 76 in accordance with this instruction.

The arithmetic circuit 76 calculates the input optical level of each channel for each station 73 according to the information it receives (S102). In other words, the arithmetic circuit 76 divides the output of PD by the number of channels of the WDM optical signal for each station 73 to obtain the optical level per channel, and adds the difference between the channels determined from the output of SPA 311 to this optical level. In this way, the arithmetic circuit 76 calculates the input optical level of each channel.

The arithmetic circuit 76 calculates partial optical SNR of each station in accordance with expression (3), that is, expression (9), according to the input optical level for each channel that is determined for each station 73 (S103).

The arithmetic circuit 76 adds the inverse number of partial SNR determined for each channel from the first station 73-1 to the fifth station 73-5 and obtains the sum of the inverse numbers (S104).

The arithmetic circuit 76 calculates the inverse number of the sum of the inverse numbers obtained for each channel, thereby determining optical SNR of each channel (S105).

Optical SNR so obtained is displayed to outside by the display device 78.

In this way, optical SNR for each channel can be determined in the zone from the first station 73-1 to the fifth station 73-5.

Incidentally, optical SNR in an arbitrary zone can be calculated by changing the summing range in S104. When optical SNR is calculated in the zone from the second station 73-2 to the fourth station 73-4, for example, the arithmetic circuit 76 may add/subtract the inverse number of optical SNR for each of the second station 73-2 to the fourth station 73-4.

In the fourth embodiment, partial optical SNR is defined by expression (3), but it may be defined by expression (5). When the station 73 is constituted as shown in FIG. 19, partial SNR can be defined by any of expressions (1), (2), (4), and (6), too.

FIG. 19 shows another construction of the station in the fourth embodiment.

Figure 19A:
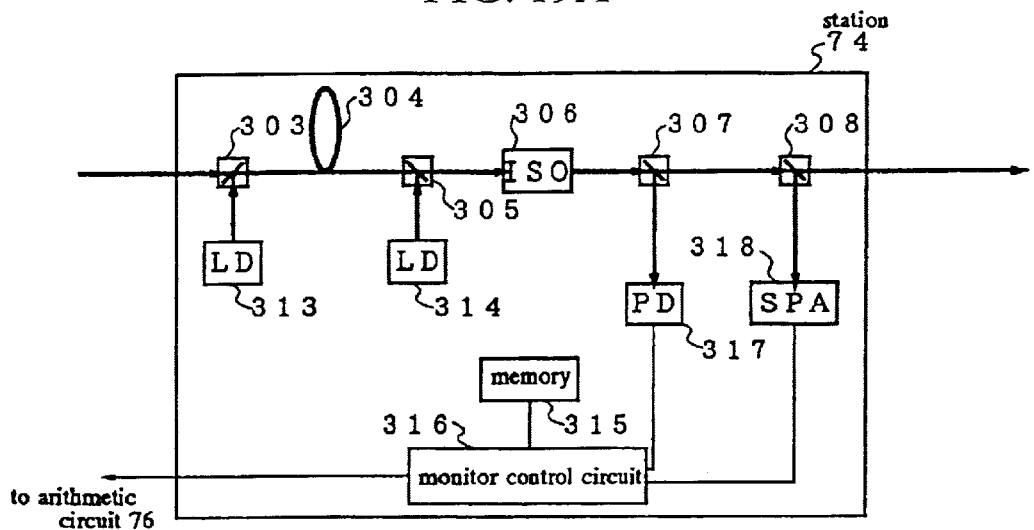
FIG. 19A shows another construction of the station in the fourth embodiment.

In order to measure the output optical level, the station 74 shown in FIG. 19A comprises SPA 318 and PD 317, that correspond to SPA311 and Pd 312 shown in FIG. 17B, on the output side of ISO 306. Therefore, the WDM optical signal inputted to the station 74 is outputted from this station 74 through the coupler 303, the rare earth element-doped optical fiber 304, the coupler 305, ISO 306, the coupler 307 and the coupler 308.

The coupler 307 branches a part of the input WDM optical signal to PD 317. PD 317 outputs the signal corresponding to the optical level of reception light to the monitor control circuit 316.

The coupler 308 branches a part of the input WDM optical signal to SPA 318. SPA 318 outputs the signal corresponding to the spectrum of the reception WDM optical signal to the monitor control circuit 316.

Incidentally, since the rest of the construction are the same as that of the station 73 shown in FIG. 17B, the explanation will be omitted.

When the station 74 having such a construction is used in place of the station 73 shown in FIG. 17A, partial optical SNR is defined by formula (6), and optical SNR can be measured.

Figure 19B:
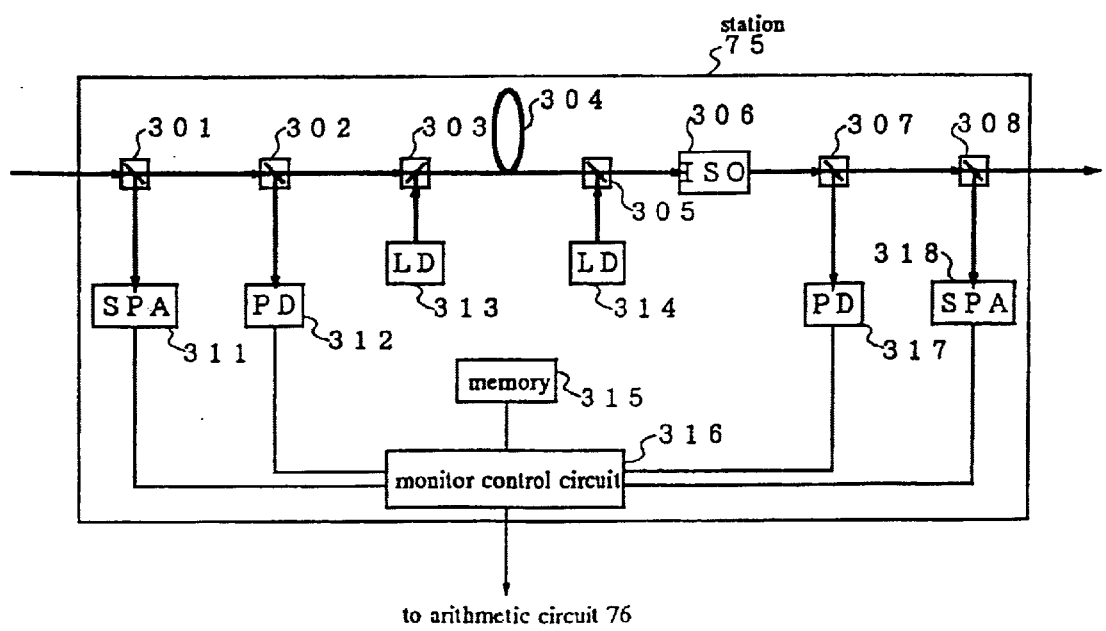
FIG. 19B shows still another construction of the station in the fourth embodiment.
Figure 20:
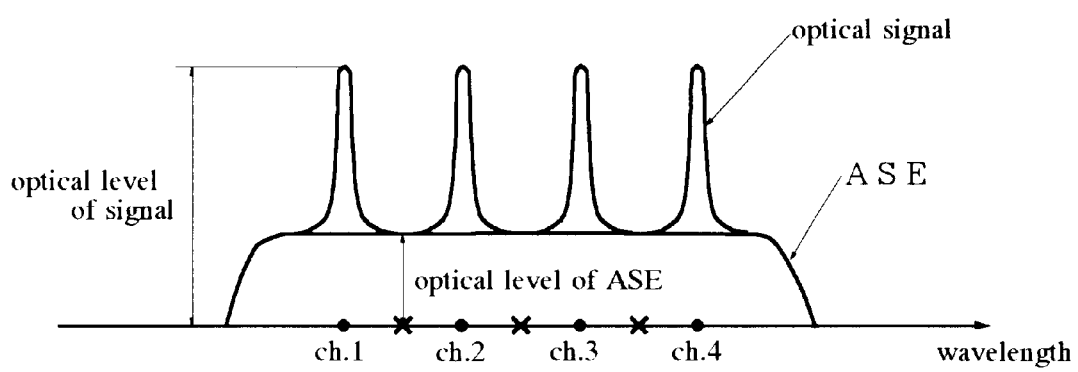
FIG. 20 is a waveform diagram useful for explaining a conventional optical SNR measuring method.
Figure 21:
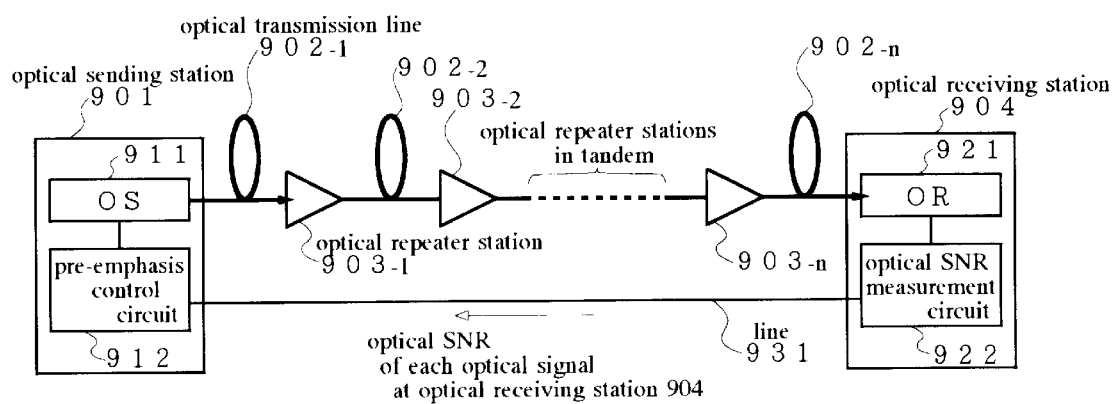
FIG. 21 shows a construction of an optical communication system for applying pre-emphasis according to the prior art.
Figure 22A:
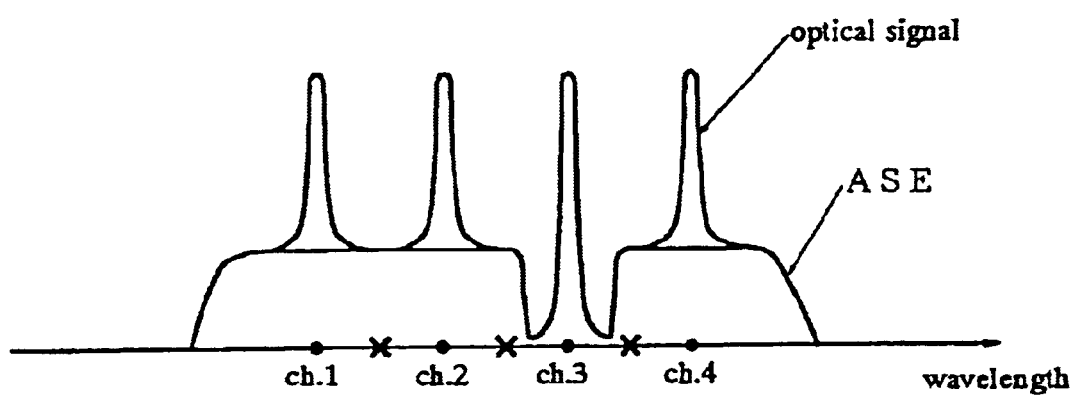
FIG. 22A shows a spectrum of a WDM optical signal wherein a channel 3 is dropped/added by OADM.
Figure 22B:
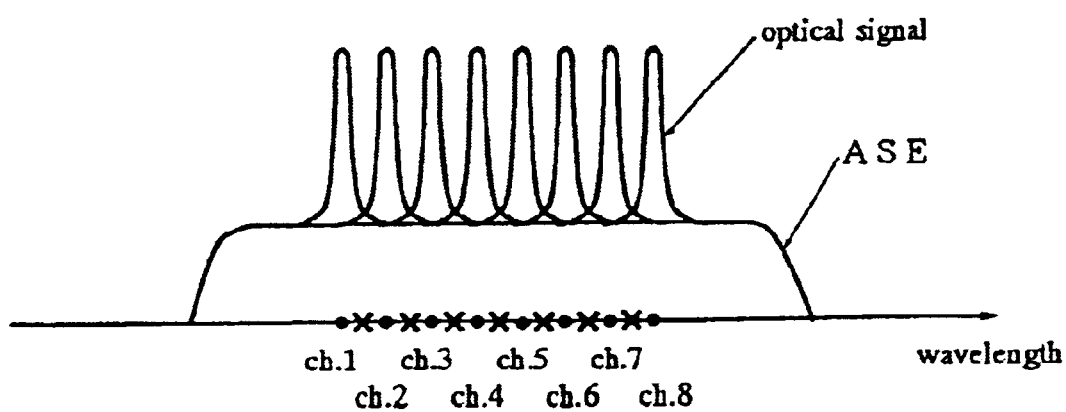
FIG. 22B shows a spectrum of a WDM optical signal having optical signals wavelength-multiplexed in a high density.

In order to measure the input optical level and the output optical level, the station 75 shown in FIG. 19B comprises SPA 311 and PD 312 that are shown in FIG. 17B and SPA 318 and PD 317 that are shown in FIG. 19A. Therefore, the WDM optical signal inputted to the station 75 is outputted from the station 75 through the couplers 301, 302 and 303, the rare earth element-doped optical fiber 304, the coupler 305, ISO 306, the coupler 307 and the coupler 308.

When the station 75 having such a construction is used in place of the station 73 shown in FIG. 17A, partial optical SNR is defined by any of the expressions (1) to (9), and optical SNR can be measured.

In the case of the station 75, the gain G for each channel may be determined from the outputs of PD 312 and 317, or may be stored in advance in a memory 315.

Incidentally, in the third embodiment, the optical level of each channel when pre-emphasis is made is regulated by using VAT 256. However, a variable output function of the optical amplifier may be used to regulate the optical level of each channel in place of VAT 256.

The second and third embodiments deal with the WDM optical signal having the number of channels of 32. However, the number of channels is not particularly restrictive, and the present invention can be applied to a WDM optical signal having an arbitrary number of channels.

Figure 13B:
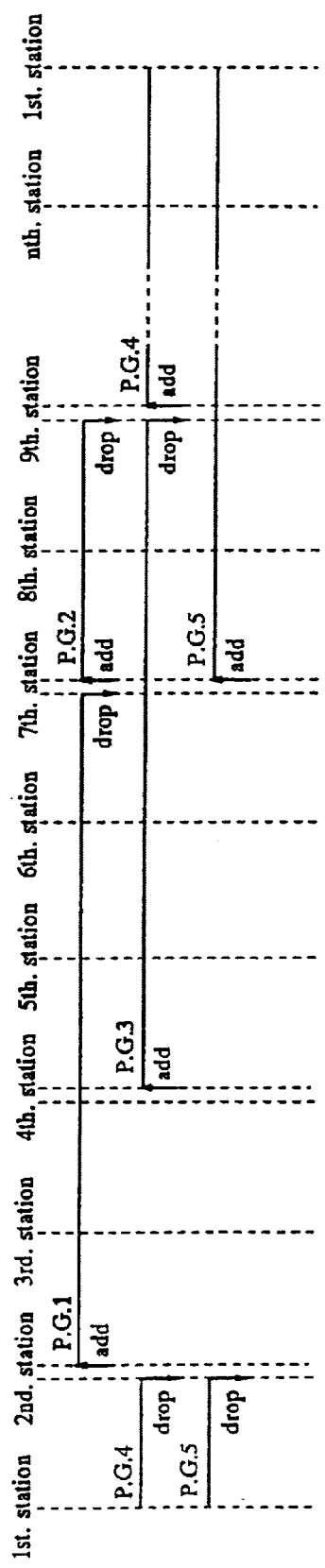
FIG. 13B shows PG in the optical communication system according to the third embodiment.

In the second and third embodiment, the paths of the respective channels are shown in FIG. 3B and 13B and are explained concretely, but the paths are not particularly limited. In other words, the paths can be set arbitrarily.

In the foregoing embodiments, the optical communication is made by using the dedicated line between the system control circuit 56 and the optical sending station control circuit 107, the optical receiving station control circuit 113 and OADM control circuit 175 in the second embodiment, between the OADM control circuit 285 and the system control circuit 65 in the third embodiment and between each station 73 and the arithmetic circuit 76 in the fourth embodiment. However, the construction is not limited to those described above. For example, it is possible to communicate by using one channel of the WDM optical signal. It is also possible to use a non-definition region of a part over-head for accommodating the information of the operation of the optical communication system such as maintenance information between transmitters, status monitors, etc, in synchronous digital hierarchy (SDH).

The invention is not limited to the above embodiments and various modifications may be made without departing from the spirit and the scope of the invention. Any improvement may be made in part or all of the components.

What is claimed is:

1. A method of measuring an optical signal-to-noise ratio comprising the steps of:

obtaining a predetermined physical quantity in a plurality of stations connected between optical transmission lines;

obtaining a partial optical signal-to-noise ratio in each of said plurality of stations according to said predetermined physical quantity; and obtaining a sum of inverse numbers of said partial optical signal-to-noise ratios and further obtaining an inverse number of the sum.

2. The method of measuring an optical signal-to-noise ratio according to claim 1, wherein:

said predetermined physical quantity is an output optical level Pout, a noise index NF, and a gain G; and said partial optical signal-to-noise ratio is defined by expression:

$$\frac{Pout}{NF \cdot G \cdot h \cdot v \cdot \Delta f}$$

according to a Planck's constant h, a frequency v corresponding to a wavelength of said optical signal, and a frequency Δf corresponding to resolution of an optical signal-to-noise ratio to be obtained.

3. The method of measuring an optical signal-to-noise ratio according to claim 1, wherein:

said predetermined physical quantity is an input optical level Pin and a noise index NF; and said partial optical signal-to-noise ratio is defined by expression:

$$\frac{Pin}{NF \cdot h \cdot v \cdot \Delta f}$$

according to a Planck's constant h, a frequency v corresponding to a wavelength of said optical signal, and a frequency Δf corresponding to resolution of an optical signal-to-noise ratio to be obtained.

4. The method of measuring an optical signal-to-noise ratio according to claim 1, wherein:

said predetermined physical quantity is an output optical level Pout and a gain G; and said partial optical signal-to-noise ratio is defined by expression:

$$\frac{Pout}{G}$$

according to a Planck's constant h, a frequency ν corresponding to a wavelength of said optical signal, and a frequency Δf corresponding to resolution of an optical signal-to-noise ratio to be obtained.

5. The method of measuring an optical signal-to-noise ratio according to claim 1, wherein:

said predetermined physical quantity is an output optical level Pout; and said partial optical signal-to-noise ratio is defined by Pout.

6. The method of measuring an optical signal-to-noise ratio according to claim 1, wherein:

said predetermined physical quantity is an input optical level Pin; and said partial optical signal-to-noise ratio is defined by Pin.

7. The method of measuring an optical signal-to-noise ratio according to claim 1, wherein said optical signal is an optical signal in a wavelength-division multiplexing optical signal obtained by wavelength-multiplexing a plurality of optical signals.

8. An apparatus for measuring an optical signal-to-noise ratio comprising:

measuring means provided in at least two of a plurality of stations connected between optical transmission lines and for measuring a predetermined physical quantity in the plurality of stations; and an arithmetic circuit for obtaining said predetermined physical quantity in said plurality of stations from the measurement result of said measuring means, a partial optical signal-to-noise ratio in each of said plurality of stations according to the obtained physical quantity, and a sum of inverse numbers of the partial optical signal-to-noise ratios and further obtaining an inverse number of the sum to thereby obtain an optical signal-to-noise ratio.

9. The apparatus for measuring an optical signal-to-noise ratio according to claim 8, wherein:

said predetermined physical quantity is an output optical level Pout, a noise index NF, and a gain G; and said partial optical signal-to-noise ratio is defined by expression:

$$\frac{Pout}{NF \cdot G \cdot h \cdot v \cdot \Delta f}$$

according to a Planck's constant h, a frequency ν corresponding to a wavelength of said optical signal, and a frequency Δf corresponding to resolution of an optical signal-to-noise ratio to be obtained.

10. The apparatus for measuring an optical signal-to-noise ratio according to claim 8, wherein:

said predetermined physical quantity is an input optical level Pin and a noise index NF; and said partial optical signal-to-noise ratio is defined by expression:

$$\frac{Pin}{NF \cdot h \cdot v \cdot \Delta f}$$

according to a Planck's constant h, a frequency ν corresponding to a wavelength of said optical signal, and a frequency Δf corresponding to resolution of an optical signal-to-noise ratio to be obtained.

11. The apparatus for measuring an optical signal-to-noise ratio according to claim 8, wherein:

said predetermined physical quantity is an output optical level Pout and a gain G; and said partial optical signal-to-noise ratio is defined by expression:

$$\frac{Pout}{G}$$

according to a Planck's constant h, a frequency ν corresponding to a wavelength of said optical signal, and a frequency Δf corresponding to resolution of an optical signal-to-noise ratio to be obtained.

12. The apparatus for measuring an optical signal-to-noise ratio according to claim 8, wherein:

said predetermined physical quantity is an output optical level Pout; and said partial optical signal-to-noise ratio is defined by Pout.

13. The apparatus for measuring an optical signal-to-noise ratio according to claim 8, wherein:

said predetermined physical quantity is an input optical level Pin; and said partial optical signal-to-noise ratio is defined by Pin.

14. The apparatus for measuring an optical signal-to-noise ratio according to claim 8, wherein said optical signal is an optical signal in a wavelength-division multiplexing optical signal obtained by wavelength-multiplexing a plurality of optical signals.

15. A method of pre-emphasizing a plurality of optical signals in wavelength-division multiplexing optical signals inputted to an optical transmission line having a plurality of stations connected in-between which are provided with an optical amplifier, comprising the steps of:

obtaining a predetermined physical quantity in said plurality of stations;

respectively obtaining a partial optical signal-to-noise ratio of each of said plurality of optical signals in said plurality of stations according to said predetermined physical quantity;

obtaining a sum of inverse numbers of said partial optical signal-to-noise ratios in a zone wherein said stations amplify said optical signals with overlap and further obtaining an inverse number of the sum to thereby obtain an optical signal-to-noise ratio of zone; and regulating optical levels of said plurality of optical signals so that said optical signal-to-noise ratio of zone become equal.

16. A pre-emphasis method according to claim 15, wherein:

said predetermined physical quantity is an output optical level Pout, a noise index NF, and a gain G; and said partial optical signal-to-noise ratio is defined by expression:

$$\frac{Pout}{NF \cdot G \cdot h \cdot v \cdot \Delta f}$$

according to a Planck's constant h, a frequency v corresponding to a wavelength of said optical signal, and a frequency $\Delta f$ corresponding to resolution of an optical signal-to-noise ratio to be obtained.

17. The pre-emphasis method according to claim 15, wherein:
said predetermined physical quantity is an input optical level Pin and a noise index NF; and
said partial optical signal-to-noise ratio is defined by expression:

$$\frac{Pin}{NF \cdot h \cdot v \cdot \Delta f}$$

according to a Planck's constant h, a frequency v corresponding to a wavelength of said optical signal, and a frequency $\Delta f$ corresponding to resolution of an optical signal-to-noise ratio to be obtained.

18. The pre-emphasis method according to claim 15, wherein:
said predetermined physical quantity is an output optical level Pout and a gain G; and
said partial optical signal-to-noise ratio is defined by expression:

$$\frac{Pout}{G}$$

according to a Planck's constant h, a frequency v corresponding to a wavelength of said optical signal, and a frequency $\Delta f$ corresponding to resolution of an optical signal-to-noise ratio to be obtained.

19. The pre-emphasis method according to claim 15, wherein:
said predetermined physical quantity is an output optical level Pout; and
said partial optical signal-to-noise ratio is defined by Pout.

20. The pre-emphasis method according to claim 15, wherein:
said predetermined physical quantity is an input optical level Pin; and
said partial optical signal-to-noise ratio is defined by Pin.

21. The method of pre-emphasizing a plurality of optical signals in wavelength-division multiplexing optical signals inputted to an optical transmission line having a plurality of stations connected in-between which are provided with an optical amplifier, comprising the steps of:
obtaining a predetermined physical quantity in a plurality of stations;
respectively obtaining a partial optical signal-to-noise ratio of each of a plurality of optical signals in said plurality of stations according to said predetermined physical quantity;
obtaining a sum of said partial optical signal-to-noise ratios of all of said optical signals amplified in each of said stations and an average value of said ratios;
respectively obtaining a difference value of said each optical signal in said plurality of stations, of which the value is between said average value and said partial optical signal-to-noise ratio;
obtaining a sum of said difference values in said stations wherein said optical signals are amplified; and
regulating optical levels of said plurality of optical signals so that sums of said obtained difference values become all zero.

22. The method of pre-emphasizing a plurality of optical signals in a wavelength-division multiplexing optical signal inputted to an optical transmission line having a plurality of stations connected in-between which are provided with an optical amplifier, comprising the steps of:
obtaining a predetermined physical quantity in said plurality of stations;
obtaining a partial optical signal-to-noise ratio of each of a plurality of optical signals in each of said plurality of stations according to said predetermined physical quantity;
obtaining a sum of said partial optical signal-to-noise ratios of all of said optical signals amplified in said plurality of stations and further obtaining an average value of said ratios to thereby obtain an average value of all optical signals;
creating a path group by collecting optical signals, of said plurality of optical signals which have been initially inputted to and finally outputted from a same zone of said optical transmission line, to be one;
obtaining a sum of said partial optical signal-to-noise ratios of said optical signals inside said path group amplified in each of said plurality of stations and further obtaining an average value of said ratios to thereby obtain a partial optical signal-to-noise ratio of said path group;
respectively obtaining a difference value of each of a plurality of path groups in said plurality of stations, of which the value is between said average value of all of said optical signals and said partial optical signal-to-noise ratio of said path group;
obtaining a sum of said difference values in said each path group;
regulating said partial optical signal-to-noise ratio of said path group so that sums of said difference values in said path groups become all zero; and
regulating optical levels of said plurality of optical signals according to said regulated partial optical signal-to-noise ratios of said path groups.

23. An optical communication system having a plurality of stations provided with an optical amplifier and an optical transmission line for connecting the plurality of stations, comprising:
measuring means provided in at least two of said plurality of stations and for measuring a predetermined physical quantity in said stations;
an arithmetic circuit for obtaining an optical level of an optical signal to be wavelength-multiplexed when first inputted to said optical transmission line, according to the measurement result of said measuring means according to pre-emphasis method; and
regulating means provided in one of said stations first inputting said optical signal to be wavelength-multiplexed to said optical transmission line and for regulating an optical level of said optical signal to said obtained optical level by said arithmetic circuit.

24. The optical communication system according to claim 23, wherein said pre-emphasis method comprises the steps of:
obtaining a predetermined physical quantity in said plurality of stations;

respectively obtaining a partial optical signal-to-noise ratio of said each optical signal in said plurality of stations according to said predetermined physical quantity;

obtaining a sum of inverse numbers of said partial optical signal-to-noise ratios in a zone wherein said stations amplify said optical signals with overlap and further obtains an inverse number of the sum to thereby obtain an optical signal-to-noise ratio of zone; and regulating optical levels of said plurality of optical signals so that said optical signal-to-noise ratios of zones become equal.

25. The optical communication system according to claim 23, wherein said pre-emphasis method comprises the steps of:

obtaining a predetermined physical quantity in said plurality of stations;

respectively obtaining a partial optical signal-to-noise ratio of said each optical signal in said plurality of stations according to said predetermined physical quantity;

obtaining a sum of said partial optical signal-to-noise ratios of all of said optical signals amplified in said plurality of stations and obtaining an average value of said ratios;

respectively obtaining a difference value of said each optical signal in said plurality of stations, of which the value is between said average value and said partial optical signal-to-noise ratio;

obtaining a sum of said difference values in said stations wherein said optical signals are amplified; and regulating optical levels of said plurality of optical signals so that sums of said difference values of said plurality of optical signals become all zero.

26. The optical communication system according to claim 23, wherein said pre-emphasis method comprises the steps of:

obtaining a predetermined physical quantity in said plurality of stations;

respectively obtaining a partial optical signal-to-noise ratio of each of a plurality of optical signals in said plurality of stations according to said predetermined physical quantity;

obtaining a sum of said partial optical signal-to-noise ratios of all of said optical signals amplified in said plurality of stations and further obtaining an average value of said ratios to thereby obtain an average value of all optical signals;

creating a path group by collecting optical signals, of said plurality of optical signals which have been initially inputted to and finally outputted from a same zone of said optical transmission line, to be one;

obtaining a sum of said partial optical signal-to-noise ratios of said optical signals inside said path group amplified in said plurality of stations and further obtaining an average value of the ratios to thereby obtain a partial optical signal-to-noise ratio of said path group;

respectively obtaining a difference value of each of a plurality of path groups in said plurality of stations, of which the value is between said average value of all optical signals and said partial optical signal-to-noise ratio of said path group;

obtains a sum of said difference values in said each path group;

regulating said partial optical signal-to-noise ratio of said path group so that sums of said difference values of said path groups become all zero; and regulating optical levels of said plurality of optical signals according to said regulated partial optical signal-to-noise ratios of said path groups.

27. The optical communication system according to claim 23, wherein said predetermined physical quantity is an output optical level Pout, a noise index NF; and a gain G, and said partial optical signal-to-noise ratio is defined by expression:

$$\frac{Pout}{NF \cdot G \cdot h \cdot v \cdot \Delta f}$$

according to a Planck's constant h, a frequency v corresponding to a wavelength of said optical signal, and a frequency $\Delta f$ corresponding to resolution of an optical signal-to-noise ratio to be obtained.

28. The optical communication system according to claim 23, wherein said predetermined physical quantity is an input optical level Pin and a noise index NF; and said partial optical signal-to-noise ratio is defined by expression:

$$\frac{Pin}{NF \cdot h \cdot v \cdot \Delta f}$$

according to a Planck's constant h, a frequency v corresponding to a wavelength of said optical signal, and a frequency $\Delta f$ corresponding to resolution of an optical signal-to-noise ratio to be obtained.

29. The optical communication system according to claim 23, wherein said predetermined physical quantity is an output optical level Pout and a gain G; and said partial optical signal-to-noise ratio is defined by expression:

$$\frac{Pout}{G}$$

according to a Planck's constant h, a frequency v corresponding to a wavelength of said optical signal, and a frequency $\Delta f$ corresponding to resolution of an optical signal-to-noise ratio to be obtained.

30. The optical communication system according to claim 23, wherein said predetermined physical quantity is an output optical level Pout; and said partial optical signal-to-noise ratio is defined by Pout.

31. The optical communication system according to claim 23, wherein said predetermined physical quantity is an input optical level Pin; and said partial optical signal-to-noise ratio is defined by Pin.

32. The optical communication system according to claim 23, further comprising:

an optical transmitting station connected to one end of said optical transmission line and provided with said regulating means; and an optical receiving station connected to the other end of said optical transmission line and provided with said measuring means.

33. A method of measuring an optical signal-to-noise ratio comprising the steps of:

obtaining a predetermined physical quantity in a plurality of optical amplifiers connected between optical transmission lines;

obtaining a partial optical signal-to-noise ratio in each of said plurality of optical amplifiers according to said predetermined physical quantity; and obtaining an optical signal-to-noise ratio by obtaining a sum of inverse numbers of said partial optical signal-to-noise ratios and an inverse number of the sum.

34. An apparatus for measuring an optical signal-to-noise ratio comprising:

a first measuring instrument for measuring a predetermined physical quantity in at least two of a plurality of optical amplifiers connected between optical transmission lines;

a second measuring instrument for obtaining a predetermined physical quantity in said plurality of optical amplifiers from the measurement result of said first measuring instrument; and an arithmetic circuit for obtaining a partial optical signal-to-noise ratio in each of said optical amplifiers according to said predetermined physical quantity measured by said first measuring instrument and obtaining a sum of inverse numbers of said partial optical signal-to-noise ratios and an inverse number of the sum to thereby obtain an optical signal-to-noise ratio.

35. A measuring circuit for measuring an optical signal-to-noise ratio comprising:

means for receiving a predetermined physical quantity from at least two of a plurality of stations connected between optical transmission lines;

means for obtaining a predetermined physical quantity in said plurality of stations according to said received physical quantity;

means for obtaining a partial optical signal-to-noise ratio in each of said plurality of stations according to said obtained physical quantity;

means for obtaining a sum of inverse numbers of said partial optical signal-to-noise ratios; and means for obtaining an inverse number of said sum to thereby obtain an optical signal-to-noise ratio.

36. A controlling apparatus for performing pre-emphasis comprising:

means for receiving a predetermined physical quantity from at least two of a plurality of stations connected between optical transmission lines;

means for obtaining a predetermined physical quantity in said plurality of stations according to said received physical quantity;

means for obtaining a partial optical signal-to-noise ratio of each of said plurality of optical signals in said plurality of stations according to said obtained physical quantity;

means for obtaining a sum of inverse numbers of said partial optical signal-to-noise ratios in a zone wherein said stations amplify said optical signals with overlap;

means for obtaining an inverse number of said sum to thereby obtain an optical signal-to-noise ratio of zone; and means for outputting a control signal which regulates optical levels of said optical signals, to one of said stations first inputting said optical signals to be wavelength-multiplexed to said optical transmission line so that said optical signal-to-noise ratios of said zones become equal.

* * * * *